United States Patent
Musante et al.

(10) Patent No.: US 7,054,890 B2
(45) Date of Patent: May 30, 2006

(54) METHOD AND APPARATUS FOR MANAGING DATA IMAGING IN A DISTRIBUTED COMPUTER SYSTEM

(75) Inventors: Mark J. Musante, Westford, MA (US); Chhandomay Mandal, Nashua, NH (US); Peter J. Wagener, Somerville, MA (US); Lanshan Zhang, Andover, MA (US); Melora L. Goosey, Andover, MA (US); Roberta A. Pokigo, Billerica, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 566 days.

(21) Appl. No.: 09/960,122

(22) Filed: Sep. 21, 2001

(65) Prior Publication Data

US 2003/0061366 A1    Mar. 27, 2003

(51) Int. Cl.
*G06F 17/30* (2006.01)

(52) U.S. Cl. .................. 707/201; 707/10; 709/230; 709/237

(58) Field of Classification Search ............... 709/223, 709/220, 217, 201, 203, 237, 316; 707/200, 707/204, 10; 719/330, 328; 711/203; 714/5
See application file for complete search history.

(56) References Cited

U.S. PATENT DOCUMENTS

| | | |
|---|---|---|
| 5,794,013 A | 8/1998 | McBrearty |
| 6,002,085 A | 12/1999 | Utsumi et al. |
| 6,058,401 A | 5/2000 | Stamos et al. |
| 6,205,415 B1 | 3/2001 | Butts et al. |
| 6,223,224 B1 | 4/2001 | Bodin |
| 6,269,373 B1 | 7/2001 | Apte et al. |
| 6,298,478 B1 | 10/2001 | Nally et al. |
| 6,332,163 B1 | 12/2001 | Bowman-Amulah |
| 6,442,541 B1 | 8/2002 | Clark et al. |

(Continued)

FOREIGN PATENT DOCUMENTS

EP    0 957 437 A2    11/1999

OTHER PUBLICATIONS

Anonymous, "Core Plans First Quarter Release of T27 and UTS Java Emulators", Unisys World, Jan. 2000, 21, p. 1-2.

(Continued)

*Primary Examiner*—Jean M. Corrielus
(74) *Attorney, Agent, or Firm*—Kudirka & Jobse, LLP

(57) ABSTRACT

A three-tiered data imaging system is used on a distributed computer system comprising hosts connected by a network. The lowest tier comprises management facade software running on each machine that converts a platform-dependent interface written with low-level kernel routines that actually implement the data imaging system to platform-independent method calls. The middle tier is a set of federated Java beans that communicate with each other, with the management facades and with the upper tier of the system. The upper tier of the inventive system comprises presentation programs that can be directly manipulated by management personnel to view and control the system. In one embodiment, the federated Java beans can run on any machine in the system and communicate, via the network. A data imaging management facade runs on selected hosts and at least one data imaging bean also runs on those hosts. The data imaging bean communicates directly with a management GUI or CLI and is controlled by user commands generated by the GUI or CLI. Therefore, a manager can configure the entire data imaging system from a single location.

20 Claims, 18 Drawing Sheets

U.S. PATENT DOCUMENTS

| | | |
|---|---|---|
| 6,453,326 B1 | 9/2002 | Parham et al. |
| 6,457,065 B1 | 9/2002 | Rich et al. |
| 6,571,232 B1 | 5/2003 | Goldberg et al. |
| 6,625,613 B1 | 9/2003 | Thompson |
| 6,629,128 B1 | 9/2003 | Glass |
| 6,704,805 B1 | 3/2004 | Acker et al. |
| 6,718,372 B1 | 4/2004 | Bober |
| 6,728,788 B1 | 4/2004 | Ainsworth et al. |
| 6,757,708 B1 | 6/2004 | Craig et al. |
| 6,772,178 B1 * | 8/2004 | Mandal et al. ............... 707/204 |
| 2002/0188591 A1 | 12/2002 | Santosuosso |
| 2003/0014432 A1 | 1/2003 | Teloh et al. |
| 2003/0014433 A1 | 1/2003 | Teloh et al. |
| 2003/0033327 A1 | 2/2003 | Mandal et al. |
| 2003/0056028 A1 | 3/2003 | Underwood et al. |
| 2003/0061366 A1 * | 3/2003 | Musante et al. ............ 709/230 |
| 2003/0061399 A1 * | 3/2003 | Wagener et al. ............ 709/321 |
| 2003/0074446 A1 | 4/2003 | Musante et al. |
| 2003/0084116 A1 | 5/2003 | Musante et al. |
| 2003/0084198 A1 * | 5/2003 | Mandal et al. ............... 709/316 |
| 2003/0088713 A1 * | 5/2003 | Mandal et al. ............... 709/328 |
| 2003/0105840 A1 * | 6/2003 | Mandal et al. ............... 709/220 |
| 2003/0172088 A1 * | 9/2003 | Mandal et al. ............... 707/200 |
| 2003/0217195 A1 * | 11/2003 | Mandal et al. ............... 709/330 |
| 2004/0024854 A1 * | 2/2004 | Mandal ....................... 709/223 |

OTHER PUBLICATIONS

Bhide, et al., "Implicit Replication in a Network File Server", IEEE, Unknown, 85-90.

Cai, et al., "SNDR: A New Medium Access Control For Multi-Channel Ad Hoc Networks", IEEE, Unknown, 966-971.

Kyeongho, et al., "Scheduling of Storage and Cache Servers For Replicated Multimedia Data", IEEE, 1997, 484-487.

Madan, et al., "A Distributed Real Time Database For Heterogeneous Computer Control Systems", IEEE, 1995, 435-440.

Makpangou, et al., "Replicated Directory Service For Weakly Consistent Distributed Caches", ACN, Unknown, 1-9.

Monson-Haefel, "Enterprise JavaBeans, 2nd Edition", Mar. 2000, 38-39, O'Reilly.

Pu, et al., "Replica Control in Distributed Systems,", ACM, 1991, 377-386.

Srnin, "An Architecture For Extended Abstract Dat Flow", IEEE, 1981, 303-325.

Thomas, "Enterprise JavaBeans Technology, Server Component Model For the Java Platform", Patricia Seybold Group, Dec. 1998, 1-24.

* cited by examiner

METHOD AND APPARATUS FOR MANAGING DATA IMAGING IN A DISTRIBUTED COMPUTER SYSTEM

FIELD OF THE INVENTION

This invention relates to management of networked computer systems and to data services, such as "snapshots" or imaging and, in particular, to distributed management of data volumes in connection with such services.

BACKGROUND OF THE INVENTION

It is common in many contemporary computer systems to require continuous access to stored information. The conventional data center procedure of taking data storage systems offline to update and backup information is not possible in these computer systems. However, system reliability demands the backup of crucial data and fast access to the data copies in order to recover quickly from human errors, power failures and software bugs. In order to recover from natural disasters, it is common to share data among geographically dispersed data centers.

The prior art has generated several solutions to meet the aforementioned data backup and sharing needs. One prior art solution is data replication in which a second copy or "mirror" of information located at a primary site is maintained at a secondary site. This mirror is often called a "remote mirror" if the secondary site is located away from the primary site. When changes are made to the primary data, updates are also made to the secondary data so that the primary data and the secondary data remain "synchronized."

Data replication can be performed at various levels. For example, the entire database may be mirrored. However, tight synchronization between the primary and mirrored data for an entire database often introduces a significant system performance penalty because of the large number of data update transmissions between the primary and secondary sites that are necessary to ensure transaction and record consistency across the entire database.

To improve system performance when data replication is used some data replication systems replicate only portions of the data. For example, replication may take place at file-level. Conventional file-level replication systems are often incorporated in the software drivers on the host and generally employ conventional networking protocols, such as TCP/IP, to connect to the remote data site over a local or wide area connection.

Alternatively, in other prior art systems, data replication takes place at the volume level, where a volume is a logical, or physical, disk segment. Instead of replicating database transactions or file systems, this technique replicates logical or, in some cases, physical disk volumes. Volume replication is flexible in the sense that it is generally independent of the file system and volume manager software. Volume replication can also be used in conjunction with database and file replication to help ensure that not just the data specific to the database or a particular file system, but all relevant data is replicated to the remote site.

In still other prior art systems, utility software is provided that generates a copy of a data volume at a particular point in time. This data copy is often called a data "snapshot" or "image" and provides a system administrator with the ability to make, and to maintain, replicated data storage systems. The advantage of making snapshots of data volumes is that the snapshot process is relatively fast and can be accomplished while other applications that use the data are running. Accordingly, the process has minimal impact on ongoing data transactions. In addition, the data image can be used to synchronize volumes in a data replication system.

In such as system, the original copy of the data is maintained on a "master volume", where the applications store data. Using the snapshot process, the master volume is replicated on another system in what is called the "shadow volume." The shadow volume can be read from, and written to, by another application and it can be used for system tests with a copy of real data without the danger of corrupting the original data. The master volume and the shadow volume together are called a volume "pair."

As the data changes in the master volume and the shadow volume, a "bitmap volume" keeps track of the blocks that change so that to update the shadow or the master volume, only the blocks marked as changed by bitmap entries need be copied. This method provides quick updates that intrude minimally on system performance with normal business data requirements.

Still other data services can be provided in prior art systems. These include data caching and notification services. No matter which of the data services are used, a significant amount of management time can be consumed in initially setting up the data service and managing it after it is running. For example, management of each of the aforementioned data imaging service requires the ability for a manager to discover volumes existing in the system. On top of the ability to discover the volumes, those volumes must be verified as suitable for data service use and may have to be configured if they are not suitable. Finally, the manager must configure the master and shadow volume "set" for data imaging and then start the imaging process.

In a large, distributed computer system connected by a network, management personnel and resources typically manage the system from a system console. However, the data manipulation processes, which actually perform the data imaging services, are typically low-level routines that are part of an operating system kernel running on a particular machine. These routines typically must run on that machine and must be written in platform-dependent language. Thus, prior art systems required a manager to physically log onto each local host in a distributed system in order to discover the volumes on that local host, verify their usability and set up the volume set.

Therefore, there is a need to provide a simple, fast way to discover volumes on hosts, both local and remote, verify their usability and set up and manage a data imaging service and to provide coordination information to a manager.

SUMMARY OF THE INVENTION

In accordance with the principles of the invention, a three-tiered data imaging system is used on a distributed computer system connected by a network. The lowest tier comprises management facade software running on each machine that converts the platform-dependent interface written with the low-level kernel routines to platform-independent method calls. The middle tier is a set of federated Java beans that communicate with each other, with the management facades and with the upper tier of the system. The upper tier of the inventive system comprises presentation programs that can be directly manipulated by management personnel to view and control the system.

In one embodiment, the federated Java beans can run on any machine in the system and communicate, via the network. A data imaging management facade runs on selected hosts and at least one data imaging bean also runs on those hosts. The data-imaging bean communicates directly with a management GUI or CLI and is controlled by user commands generated by the GUI or CLI. Therefore, a manager can configure the entire data imaging system from a single location.

In another embodiment, another bean stores the configuration of the data replication system. This latter bean can be interrogated by the data-imaging bean to determine the current system configuration.

In still another embodiment, a data service volume bean locates and prepares volumes that can be used by the data imaging system.

In yet another embodiment the presentation programs include a set of management graphic user interfaces (GUIs)

In another embodiment, the presentation programs include command lines interfaces (CLIs).

BRIEF DESCRIPTION OF THE DRAWINGS

The above and further advantages of the invention may be better understood by referring to the following description in conjunction with the accompanying drawings in which.

DETAILED DESCRIPTION

Data Services are software products that consist of two parts: a set of kernel drivers, which provides the actual service on the local platforms, and the user level management software. The kernel drivers reside in the host memory and would generally by implemented in platform-specific code, for example, in C routines that expose application programmer interfaces (APIs) that can be accessed only from the host in which the layer is installed. The set of kernel drivers providing the service can be installed on application servers as well as dedicated storage servers. These installations are illustrated in FIGS. 1A and 1B.

Figure 1:
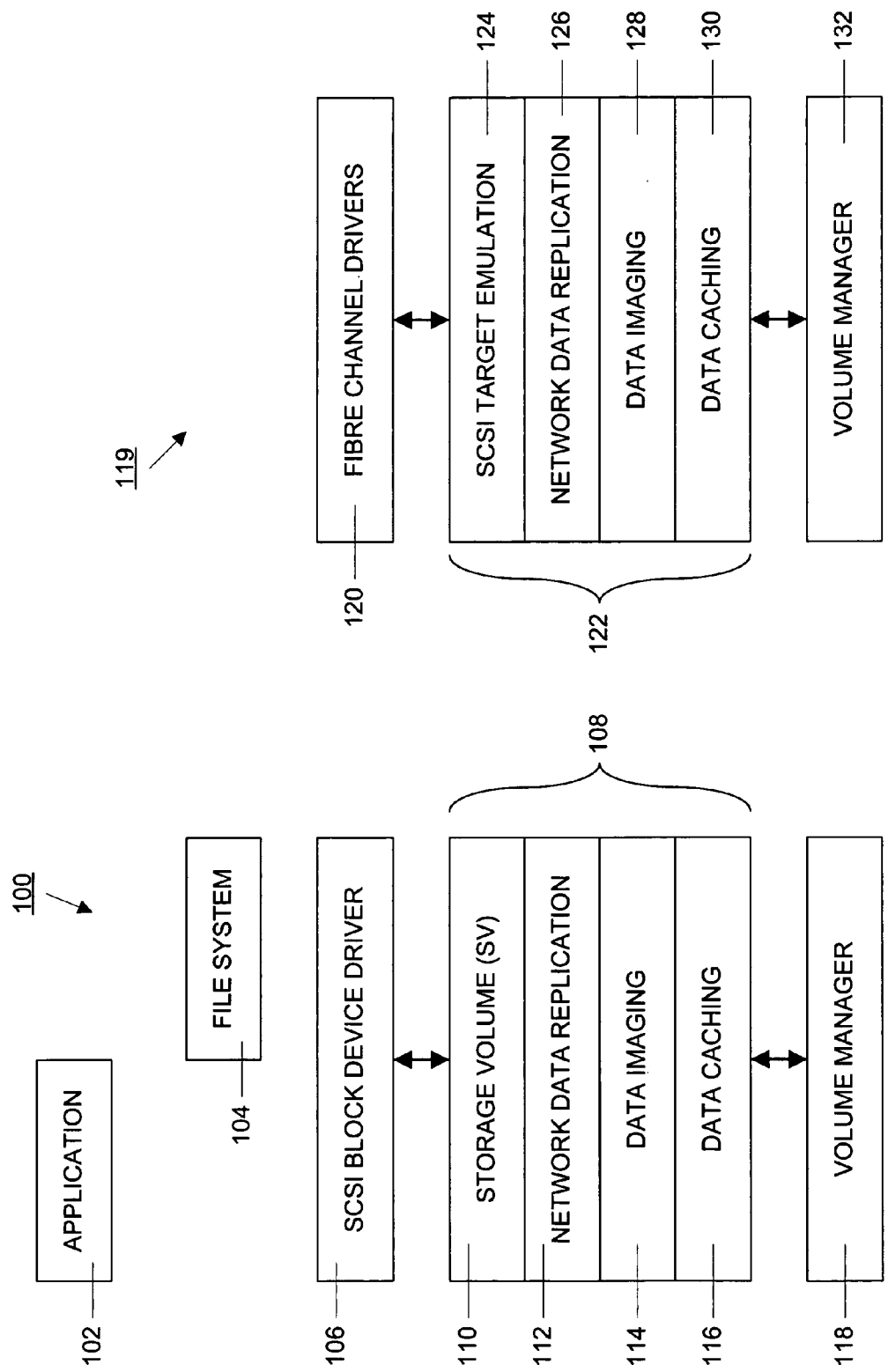
FIG. 1A is a block schematic diagram of illustrating the platform-specific kernel drivers that provide a variety of data services in an application server.
FIG. 1B is a block schematic diagram of illustrating the platform-specific kernel drivers that provide a variety of data services in a storage server.

As shown in FIG. 1A, in the memory of an application server 100, the data service kernel modules 108 layer within the operating system I/O stack above volume manager 118 and below the disk device drivers 106. The data service kernel modules include a storage volume module 110 that implements a storage volume interface (SVI) data service that provides data redirection. In particular, the storage volume layer 110 insinuates itself between the standard Small Computer Standard Interface (SCSI) block device driver 106 and the underlying drivers and shunts I/O information through the other data service kernel modules 112–116.

The network data replicator kernel module 112 provides data replication services that involve transparent replication of volumes over public or private Internet protocol infrastructure, or locally, via SCSI protocol, over fibre channel connections. Synchronous, asynchronous and semi-synchronous modes of replication are supported. Module 112 provides support for loss of a network link (or a remote node) via a logging mode where I/O writes to a local volume are logged in a separate bitmap volume. When the network link is restored (or the remote node recovers), the remote volume can by resynchronized to the local volume. Module 112 is part of a "StorEdge™ network data replicator system" (SNDR system). "StorEdge™" is a trademark of Sun Microsystems, Inc.

The data imaging module 114 implements a "point-in-time" volume copy data service between a volume pair in a data image volume set. Illustratively, the data imaging system could be an "Instant Image" data imaging system (II data imaging system.) "Instant Image™" is a trademark of Sun Microsystems, Inc. A data image volume set contains a volume pair, including the original logical volume (the master volume) and the point-in-time copy of the original (the shadow volume), and a volume used to store a bitmap that tracks the differences between the master and shadow volumes. Once the data image volume pair is established, the master and shadow volumes can be accessed independently. As discussed below, the data-imaging module allows data updates to be sent from the master volume to the shadow volume as well as updates to be sent from the shadow volume to the master volume when desired.

The caching module 116 provides block based caching operations for disk input/output. These operations provide typical caching functionality, such as read caching, read ahead and small write coalescing for sequential writes.

Module 116 also provides write caching when non-volatile RAM cards are installed as a safe store (called a "fast write cache").

On a dedicated storage server 119 as illustrated in FIG. 1B, the kernel modules 122 are located between fibre channel drivers 120 and the volume manager software 132. Modules 122 are accessed through an emulation layer 124 that allows the storage server to appear as a SCSI target to fibre-channel-connected open system hosts. Thus, the SCSI Target Emulation (STE) module 124 provides an STE data service that allows any backend storage to be exported for use on another host through a fiber channel. The host that has the STE kernel module 124 runs a fibre port in SCSI target mode, while the fibre ports at the client run as SCSI initiators.

The network data replicator module 126, the data imaging module 128 and the data caching module 130 operate in the same manner as they do in the application server example shown in FIG. 1A. The data service kernel module architecture requires that any volume that will be used by a data service must already be under the control of either the SCSI Target Emulation (STE) data service module 124, or the Storage Volume Interface (SVI) data service module 110. The difference is that the STE volumes are always exported to remote hosts so that local volumes must be SVI volumes.

A data imaging system constructed in accordance with the principles of the invention comprises three layers or tiers. The first, or upper, tier is a presentation layer with which a manager interacts at a single host location. The upper tier, in turn, interacts with the middle tier comprised of a plurality of federated beans, each of which performs specific tasks in the data imaging system. The federated beans can communicate with each other both in the same host and in other hosts via a network connecting the hosts. Some of the beans can communicate with the lowest tier that comprises the aforementioned kernel modules that actually perform the data services. In this manner an entire data imaging system can be configured and managed from a single location.

Figure 2:
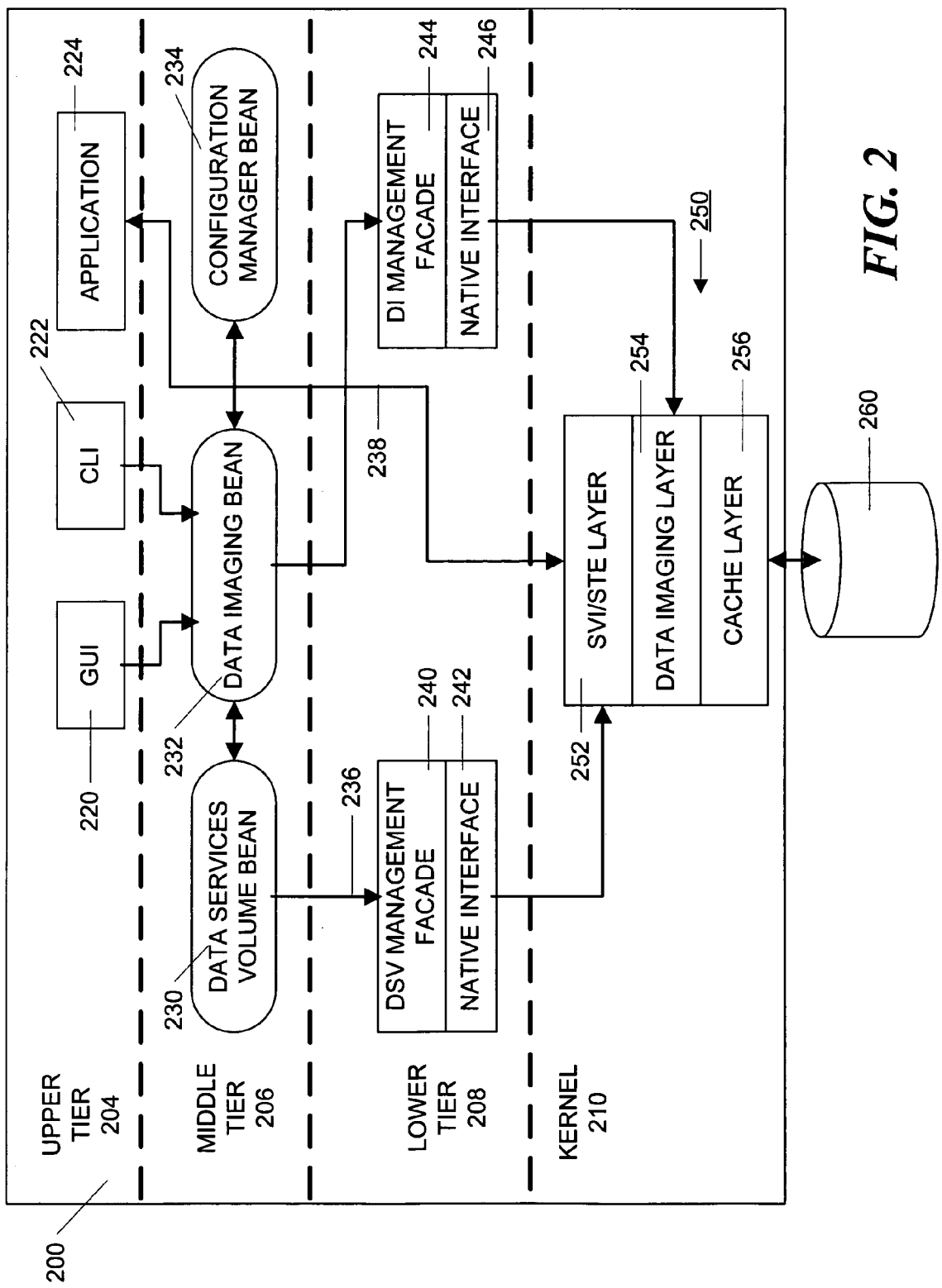
FIG. 2 is a block schematic diagram of a three-tiered system for providing a data imaging service in a single host, illustrating an upper presentation tier, a federated bean middle tier and a management facade lower tier.

FIG. 2 shows a host system 200 that illustrates the contents of the three tiers running in the memory of a single host. The inventive data service system comprises three layers or tiers: an upper tier 204, a middle tier 206 and a lower tier 208. The upper tier 204 is a presentation level which can be implemented with either a graphical user interface (GUI) 220 or a command line interface (CLI) 222, both of which are described in detail below. A manager interacts with this level, via the GUI 220 or CLI 222, in order to create, configure and manage a data imaging system. The GUI 220 and the CLI 222, communicate with the data imaging bean 232 running in the host 200 where the GUI 220 and CLI 222 are running as indicated in FIG. 2.

The middle tier 206 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html.

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. Dynamic services are provided by the federated Java beans of the middle tier. Dynamic services require a hosting entity called a "station", which is a mechanism to allow many services to run within a single Java Virtual Machine. Every management domain contains one or more general-purpose shared stations.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at http://www.jiro.com, which manual is incorporated by reference in its entirety.

For data imaging purposes, two main federated beans are involved. These include the data imaging bean 232 and the data services volume (DSV) bean 230. Data imaging bean 232 implements the aforementioned data imaging system and DSV bean 230 locates, configures and manages volumes used by the data-imaging bean. The data imaging bean 232 communicates with the DSV bean 230 whenever data imaging bean 232 starts or stops using a volume managed by DSV bean 230.

In order to manage a data imaging system, data imaging bean 232 communicates with a data imaging layer 254 in the layered stack 250, via a data imaging management facade 244 and a native interface 246. The data imaging capability of the invention is actually implemented in the kernel layer 210 shown running in host 200 in FIG. 2. In particular, access by the host 200 to a resource 260, which can be a data storage component, is provided by a layered stack 250 comprising the aforementioned SVI or STE layer 252, as appropriate, a data imaging layer 254 and a cache layer 256 and may also include other layers (not shown in FIG. 2). Application programs running in host 200, such as application 224, and the host file system access resource 260 though the layered stack 250 as indicated schematically by arrow 238.

In order to provide for remote management capability in accordance with the principles of the invention, the data imaging layer 254 and the SVI/STE layer 252 are controlled by software running on the lower tier 208 of the inventive data services system. The lower tier includes a native interface 246 that converts the APIs exported by the data imaging layer 254 into a platform-independent language, such as Java™. The native interface 246 is, in turn, controlled by a data imaging management facade 244 that provides the required remote management capability.

The data imaging management facade 244 provides a means by which the data imaging layer 254 can be accessed and managed as a Jiro™ service. The native interface 246 converts the platform-specific kernel routine API's to platform independent interfaces. The data imaging layer 254 allows the data imaging bean 232 to manage logical volume sets for use by a data imaging system.

Whenever changes are made in the data configuration of host 200, both the DSV bean 230 and the data imaging bean 232 can inform a configuration manager bean 234 of the change in configuration information. Data imaging bean 232 also retrieves configuration information from the configuration manager bean 234 under appropriate situations. The configuration manager bean 234 maintains a persistent view of the configuration of the data services system on host 200. In this manner, if the host is interrupted during an operation, it can be restored to the proper state when the operation is resumed.

DSV Bean 230 is responsible for discovering volumes available on the local system 200, configuring those volumes when necessary, via an SVI/STE management facade 240, and coordinating the use of those volumes between other data service federated beans. DSV bean 230 is a Federated Bean as described in the aforementioned Federated Management Architecture (FMA) specification. When created, it registers itself with a local Jiro™ station, and provides its services to any other federated beans within the same Jiro™ management domain. In particular, the data-imaging bean 232 can contact the DSV bean 230 in order to obtain lists of volumes available for data imaging purposes.

Along with providing the ability to control the SVI and STE data services, DSV Bean 230 also gives clients the ability to discover what other applications are currently using a particular volume. Assuming these other applications have implemented the required interfaces, clients can also retrieve more detailed information about volume usage. For example, a client can discover if one of the data services is currently blocking write access to a specified volume. Thus, the DSV bean 230 provides tools that applications can use to correctly diagnose errors produced when multiple data services attempt to access volumes in an inconsistent manner.

The DSV management facade 240 provides a means by which the SVI/STE layer 252 can be accessed and managed as a Jiro™ service, i.e., a service that can be managed in a distributed environment from a remote host. The DSV management facade 240 is essentially an object-oriented model of the kernel-resident SVI/STE layer 252. It provides a collection of APIs to manage the SVI/STE layer 252. The DSV federated bean 230 uses the DSV management facade 240 to configure, control and examine the status of the SVI/STE layer 252 and to provide other important functions.

Figure 3:
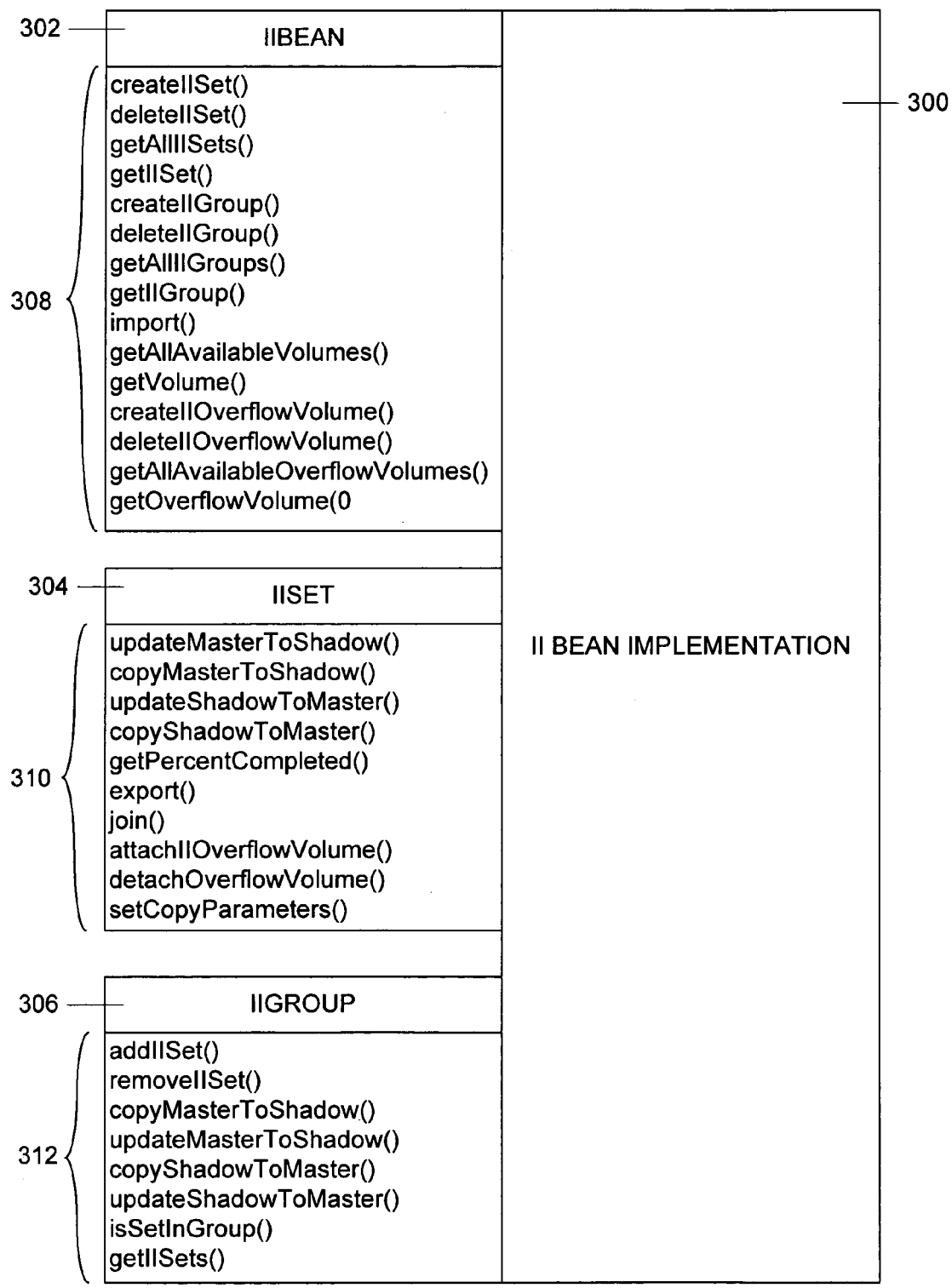
FIG. 3 is a schematic block diagram illustrating the architecture of a data imaging bean and the interfaces exported by the bean.

The interfaces exported by the data-imaging bean 232 are shown in FIG. 3. In order to understand the operation of the data-imaging bean, the concept of an Instant Imaging™ (II)Set and an IIGroup need to be introduced. An IISet is an operational entity that contains information regarding the original data copy (the master volume), the replicated data copy (the shadow volume) and the bitmap volume that keeps track of changed data blocks that occur in changes made to the master and shadow volumes.

Shadow volumes can be specified as independent types. When an independent shadow volume is created, a full volume copy occurs from the master volume to the shadow volume so that, when the copy operation completes the shadow volume is identical to the master volume, excluding any application writes that occurred to the shadow volume while the copy operation was in progress. Thus, the size of the shadow volume must be equal to, or greater than the size of the master volume, preferably the volumes are the same size. After, the point-in-time copy is made, applications can read and write to either the master or the shadow volumes. Of course, once a write has occurred, the master and shadow volumes are no longer identical.

Alternatively, the shadow volume can be a dependent type. When a dependent shadow volume is created, no full volume copy occurs. Instead, any reads directed to the shadow volume are answered with data from the master volume. When a write occurs to the master volume, the original data in the master volume that will be overwritten is written first to the shadow volume, then the new data is written to the master volume. The location of the changed data in the master volume is tracked on the bitmap volume. Any read to the shadow volume that requests data from a changed data block (as determined by the bitmap volume) is answered from the shadow volume which contains only original point-in-time data. The shadow volume does not contain new master volume data unless an update or copy command is issued by a manager.

Since the dependent shadow volume does not contain a full copy of the original master data, it does not have to be equal in size to the master volume. If the dependent shadow volume is smaller than the master is, it is called a "compact" shadow volume (also called short-shadow volume). Compact shadow volumes are associated with an overflow volume which can be used to store any writes to the compact shadow volume which occur after the compact shadow volume becomes full.

The bitmap volume tracks writes to either the master volume or the shadow volume so that updates can be performed from master volume to shadow volume or from shadow volume to master volume. The bitmap can be located on any volume or file system except for the volume that contains the master volume and the volume that contains the shadow volume. Alternatively, the bitmap can be kept entirely in memory. When the master and either independent or dependent shadow volumes are resynchronized, only the changes as noted in the bitmap are copied.

The name of the IISet is taken from the included shadow volume and operations performed using the inventive data imaging software are performed on IISets. In addition, an overflow volume can be attached to an IISet; a single overflow volume can be attached to one or more IISets.

IISets, with or without associated overflow volumes, can also be grouped together to allow the data imaging software to perform the same operation, such as an update or copy operation, on multiple volume sets at one time with a single command. Such as group of IISets is called an IIGroup. An IIGroup can be named and consists of any number of IISets. Volume sets can be added or deleted from IIGroups without first quiescing the volumes, as discussed below.

If the primary host needs to have some, or all, of its workload removed, the shadow volumes of any or all volume sets can be "exported" so that another host, also running the same data imaging software, can "import" the shadow volumes. The business transactions can then be continued from that second host. The export/import operation has several advantages. For example, exporting can be used as a way to test new data processing operations offline, using real data, before incorporating these operations into an online business. When desired, the shadow volume can be disabled at the second host and then rejoined to its master volume on the primary host with, or without, the changes made by the secondary host.

In order to export a shadow volume, the volume must be an independent shadow and it must be updated just prior to the export so that it matches the master volume exactly. In addition, the shadow volume must reside on a dual-ported device. While the shadow volume remains in the exported status, it cannot be updated by its master, but the master can continue to accept data and track the changes in its associated bitmap.

A secondary host can import the shadow volume with a command that requires that a bitmap volume be named to track changes to the shadow volume while the volume is in the imported status. After the import process in complete, a new volume set can be enabled with the imported shadow volume designated as a master volume. Business operations or technical evaluations can then take place with the new volume set on the secondary host.

The secondary host disables the imported shadow volume when it is finished with it. The primary host can then join the shadow volume to its master volume. If a bitmap for the join is not specified, the primary host bitmap and the secondary host bitmap will be used to join the shadow to the master. If a bitmap is specified, then that bitmap is used in conjunction with the stored data to join the volumes. Because several volume sets may include the same master, it is important to be able to select which bitmap to use for the join operation.

In addition, a master volume may have more than one shadow volume. A new point in time copy may be taken onto a different shadow volume at regular intervals. When this is done, each shadow volume is unrelated to the others. In the case of dependent shadow volumes, writing to the master volume will cause master data to be copied to each of the shadow volumes before being written to the master. The master may be updated from any of its shadow volumes without changing the contents of the other shadow volumes, subject to space being available on compact dependent shadow volumes.

The Instant Imaging Federated Bean comprises an implementation 300 that is created by a constructor for a particular Jiro™ domain. When created, the IIBean attempts to connect to an IIAdminMF interface in the DI management facade (discussed below.) The IIBean implementation 300 has three interfaces, an IIBean interface 302, an IISet interface 304 and an IIGroup interface 306. The IIBean interface 302 includes a number of methods 308. In order to simplify the diagram, some conventional "get" and "set" methods have been omitted from methods 308. Methods 308 include a createIISet( ) method that creates an IISet object associated with a master volume, a shadow volume and a bitmap volume with names specified in the method parameter list. A deleteIISet( ) method deletes an IISet object specified by name or object ID and restores all the associated volumes back to the volume pool.

A getAllIISets( ) method returns an array of all configured IISets maintained by the IIBean federated bean. If no IISet is configured, an array of zero length IISet specifications is returned. The getIISet( ) method accepts a set name and returns an IISet object with the specified name. It returns null if the name is not found or is null. The createIIGroup( ) method creates an IIGroup object with a name specified as a parameter. The group includes a specified initial collection of IISets in the group with a specified type (independent or dependent.) All elements in the IISet collection must be the same type and must not currently in an active operation. The deleteIIGroup( ) method deletes a specified IIGroup from the IIBean. The getAllIIGroups( ) method returns an array of IIGroup objects maintained by the IIBean. The getIIGroup( ) method returns an IIGroup object with a specified group name. It returns null if the specified name is not found or is null.

The import( ) method imports a shadow volume previously exported using the corresponding bitmap to track changes while the volume is being imported. The getAllAvailableVolumes( ) method returns an array of available volumes that are not yet assigned to any IISet or IIGroup. If no volume is available, an array of zero length is returned.

The getVolume( ) method returns a volume with a specified name. It returns null if none is found or the specified name is null.

The createOverflowVolume( ) method creates an overflow volume specified by a provided volume path name or volume ID. The deleteOverflowVolume( ) method deletes a specified overflow volume from the IIBean. The getAllAvailableOverflowVolumes( ) method returns an array of available overflow IIBeanOverflowVolumes for the IIBean. If no overflow volume is found, an array of zero length IIBeanOverflowVolume is returned. Finally, the getOverflowVolume( ) method returns an IIBeanOverflowVolume object with a specified path. It returns null if the specified path is not found or is null.

The IISet interface 304 includes a number of methods 310. As with the IIBean interface 302, in order to simplify the diagram, some conventional "get" and "set" methods have been omitted from methods 310. Methods 310 include an updateMasterToShadow( ) method that initiates a master volume to shadow volume update process for a specified volume set. If the specified set is assigned to an IIGroup, then this operation must be initiated from the associated IIGroup. A copyMasterToShadow( ) method initiates a master to shadow volume copy process for a specified volume set. If the set is assigned to an IIGroup, this operation must be initiated from the associated IIGroup.

An updateShadowToMaster( ) method that initiates a shadow volume to master volume update process for a specified volume set. If the specified set is assigned to an IIGroup, then this operation must be initiated from the associated IIGroup. A copyShadowToMaster( ) method initiates a shadow to master volume copy process for a specified volume set. If the set is assigned to an IIGroup, this operation must be initiated from the associated IIGroup.

The getPercentCompleted( ) method returns the percent of volume copied between master and shadow volumes. The export( ) method exports the shadow volume of the IISet object for use by another system. The join( ) method joins the shadow volume of the IISet object with a specified bitmap that was previously exported. The bitmap supplied is the bitmap used on the foreign host that tracked changes while the export process was proceeding.

The attachOverflowVolume( ) and detachOverflowVolume( ) methods attach and detach a specified overflow volume to the set represented by the IISet object. In the case of a detach operation, if the overflow volume is active, the method will fail. The setCopyParameters( ) method redefines size and delay parameters for a copy operation.

The IIGroup interface 306 includes a number of methods 312. As with the IIBean interface 302 and the IISet interface 304, in order to simplify the diagram, some conventional "get" and "set" methods have been omitted from methods 312. Methods 312 include an addIISet( ) method that adds a specified IISet of a compatible type to the group represented by the IIGroup object. The added set and the current group must not be in an active operation and the set must not be already contained in another group. Likewise, the removeIISet( )removes a specified IISet from the group. The removed set and the current group must not be in an active operation.

A copyMasterToShadow( ) method initiates a master to shadow volume copy process for all IISets in the group as an atomic operation. An updateMasterToShadow( ) method that initiates a master volume to shadow volume update process for all IISets in the group.

An updateShadowToMaster( ) method that initiates a shadow volume to master volume update process for all IISets in the group as an atomic operation. A copyShadowToMaster( ) method initiates a shadow to master volume copy process for all IISets in the group as an atomic operation. The isSetInGroup( ) method tests if the specified IISet is in the current group or returns null if a null value is specified. The getIISets( ) method returns an array of IISet objects maintained by the IIGroup.

Figure 4:
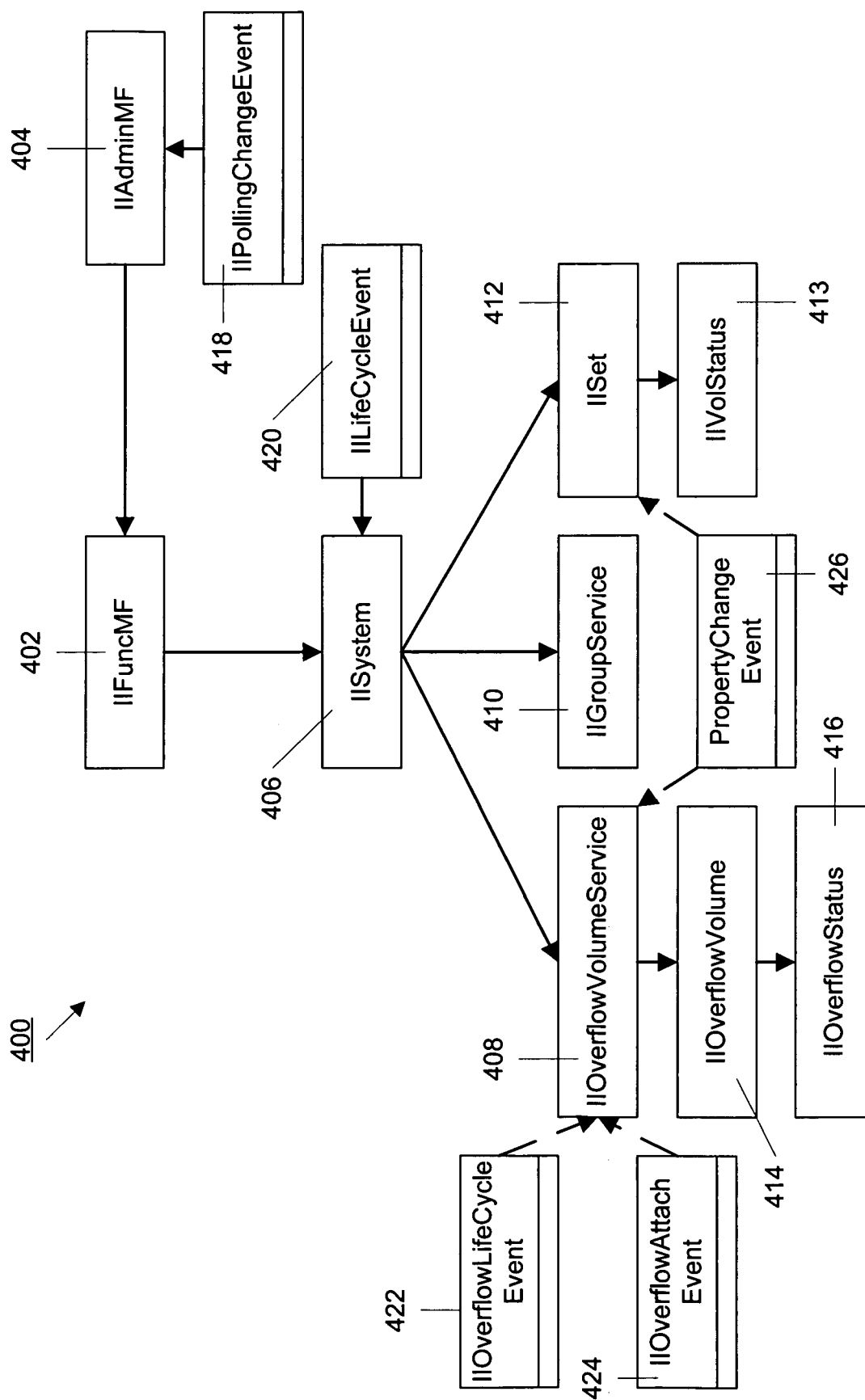
FIG. 4 is a schematic diagram of the interfaces exported by a data imaging management facade.

As previously mentioned, the data imaging bean controls the data imaging kernel layers that actually perform the data imaging by means of a Jiro™-based management facade. FIG. 4 illustrates the data imaging management facade interfaces 400 that are used by the data-imaging bean. The data-imaging bean can lookup the imaging administrative interface, IIAdminMF 404, through the Jiro™ lookup service. The imaging functional interface, IIFuncMF 402, can also be discovered through the Jiro™ lookup service as well as can be retrieved from the IIAdminMF interface 404 using a getIIFuncMF( ) method. Once the data imaging bean gets the imaging functional interface 402, it can call the relevant client interfaces such as IISystem 406 that provides mechanisms to manage the imaging point object and acts as a container for all IISets.

The data imaging bean can also call methods in the IIOverflowVolumeService interface 408 that provides mechanisms to manage overflow volumes in the data imaging system. The IIOverflowVolumeService interface 408 includes the IIOverflowVolume interface 414 methods and the IIOverflowStatus interface 416 that allow the data imaging bean to manager the overflow volumes.

An IIGroupService interface 410 provides mechanisms to manage IIGroups in the data imaging system. Similarly, an IISet interface 412 provides the mechanisms to manage the IISets. The IISet interface 412 includes the IIVolStatus interface 413 that contains mechanisms to determine the status of volumes manager by the data imaging system.

FIG. 4 also illustrates various significant events generated by the management facade. For example, the IIAdminMF interface generates an IIPollingChangeEvent 418 if the polling interval has changed. Similarly, the IISystem interface 406 generates an IILifeCycleEvent 420 upon the occurrence of various life cycle events to the IISystem object (construction, destruction, etc.) Similar life cycle events (IIOverflowLifeCycleEvent 422) are generated by the IIOverflowVolumeService object. The IIOverflowVolumeService object also generates an IIOverflowAttachEvent 424 when an overflow volume is attached to an IISet.

Finally, the OverflowVolumeService objects and the IISet objects generate PropertyChangedEvents 426 when selected properties of these objects are changed.

Figure 5:
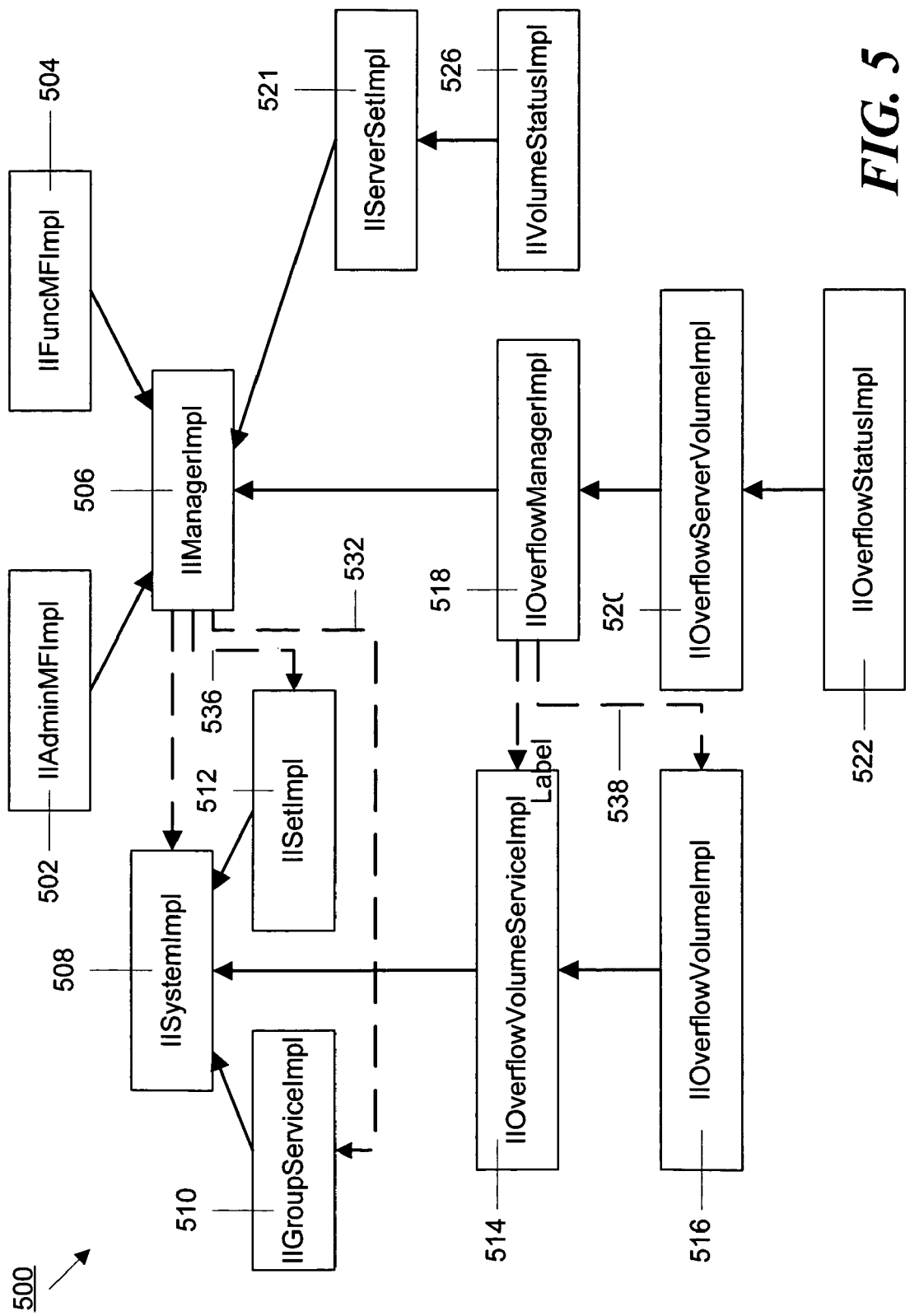
FIG. 5 is a schematic diagram of the implementation classes for the data imaging management facade shown in FIG. 4.

FIG. 5 illustrates the implementation details of the data imaging management facade. In this implementation, several manager objects carry out the underlying operations needed to manage the data imaging service. The IIManagerImpl 506 is the overall coordinator and is controlled by the IIAdminMFImpl 502 and the IIFuncMFImpl 504. The IIManagerImpl 506 delegates the overflow management to the IIOverflowManagerImpl 518 and the IISet management to the IIServerSetImpl 521. The IIManagerImpl further delegates management responsibilities to the IISystemImpl 508 as indicated by arrow 528, the IIGroupServiceimpl 510 as indicated by arrow 532 and the IISetImpl 512 as indicated by arrow 536. The IIGroupServiceImpl 510, the IIOverflowVolumeServiceImpl 514 and the IISetImpl 512 are part of the IISystemImpl 508.

The IIOverflowManagerImpl 518, in turn, delegates management responsibility to the IIOverflowVolumeServiceImpl 514 as indicated by arrow 534 and to the IIOverflowVolumeImpl 516 as indicated by arrow 536. The IIOverflowVolumeServiceImpl 514 also contains the IIOverflowVolumeImpl 516. The IIOverflowManagerImpl 518 uses the IIOverflowServerVolumeImpl 520 that, in turn, uses the IIOverflowStatusImpl 522. The IIServerSetImpl 521 uses the IIVolumeStatusImpl 526.

Figure 6:
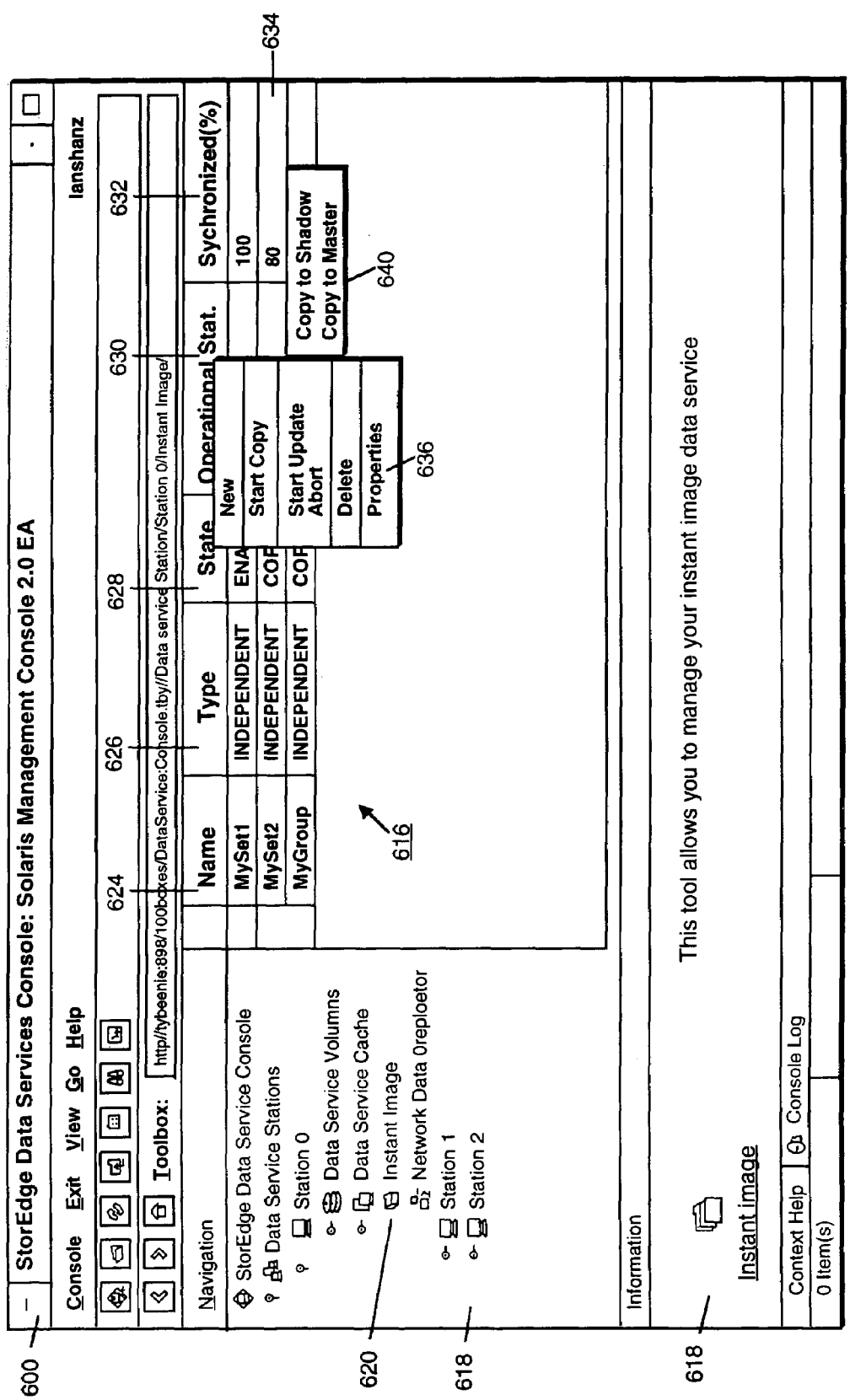
FIG. 6 is a screen shot of a screen display generated by a graphic user interface that controls a data imaging bean showing the display of data imaging sets and groups.

A screen shot showing the screen display generated by the GUI 220 (FIG. 2) for viewing and controlling data imaging volume sets is illustrated in FIG. 6. This figure displays a screen 600 that displays information concerning data imaging sets and groups that would be generated by the graphic user interface after selection of the "Instant Image" display 620 in the navigation pane 618. Information regarding the selection is shown in the information panel 638. Screen 600 illustrates information that is displayed after IISets and IIGroups have been configured using the "New Set/Group" option in the pop-up menu described below. The screen 600 contains a table 616 that displays all currently configured IISets and IIGroups. In column 622, a group or set icon appears. The Name column 624 displays the name of the set or group. Column 626 displays the Type (independent/dependent). Column 628 displays the State (enabled/suspended/copying/updating/unknown) and column 630 displays the Status (normal/degraded/error) for each displayed IISet and IIGroup. Additionally, column 632 displays the percentage of synchronization between master and shadow volumes for IISets.

Right clicking on a line representing an IISet or an IIGroup, such as line 634, activates an "action dropdown" 636. The action dropdown has several options, including "New", "Start Copy" or "Start Update", "Abort" the copy or update process, "Delete", and view "Properties." When the "New" option is selected, a further menu appears that allows a manager to select whether a new IISet or a new IIGroup is to be created. In addition, when the "Start Copy" or "Start Update" options are selected, a further menu 638 appears that allows a manager to select the destination—"to Shadow" or "to Master." FIG. 6 shows the "action dropdown" 636 with the options displayed.

Figure 7:
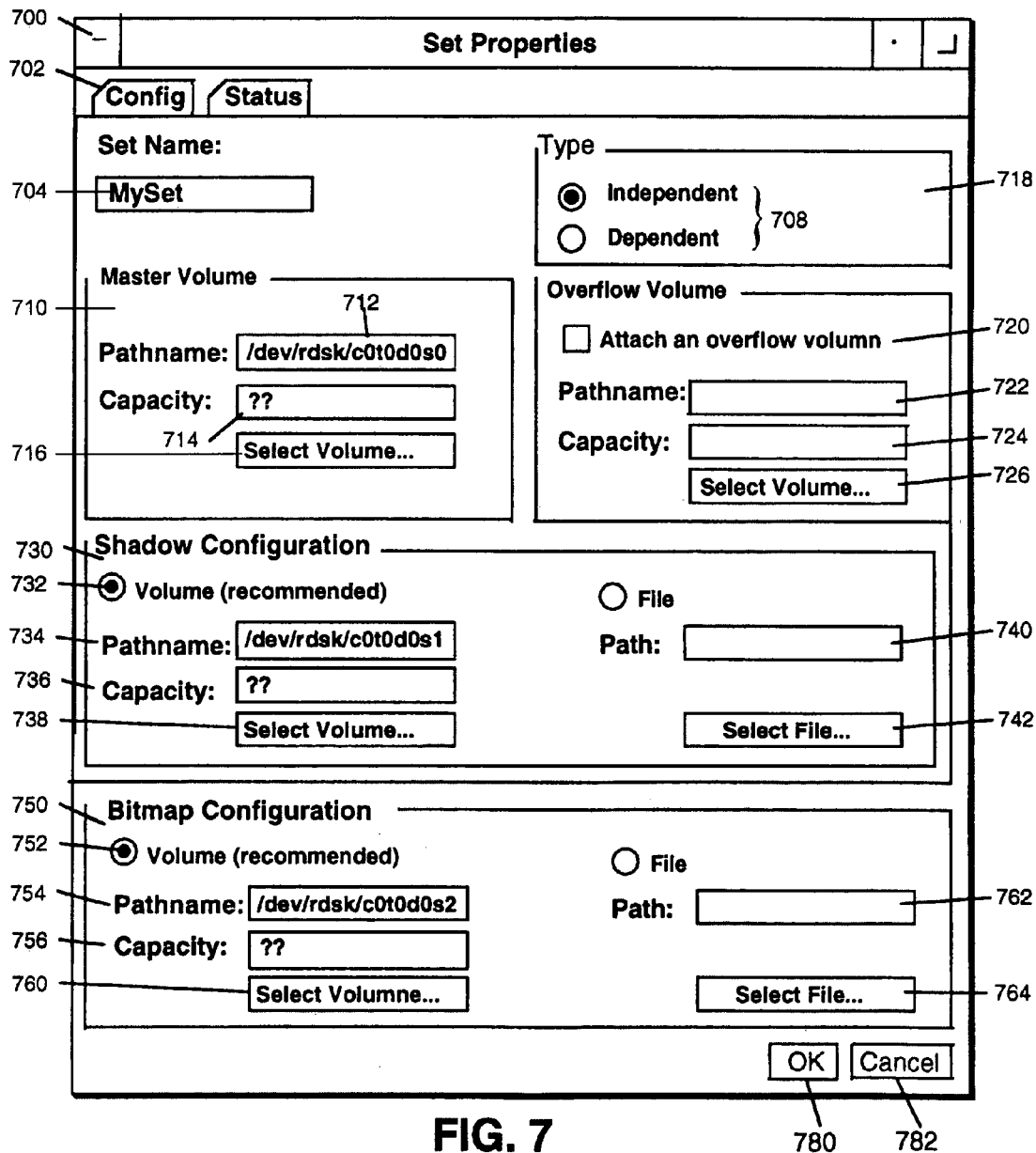
FIG. 7 is a screen shot of a screen display generated by a graphic user interface showing a dialog box display for configuring data imaging sets.

When a manager clicks the "New" option and selects "Set" in the extended menu in the dropdown 636, the set configuration dialog 700 shown in FIG. 7 appears. The screen display is shown with the "Config" tab 702 selected. The display allows a manager to create a set by entering a name in textbox 704 and selecting a type in panel 706 by means of radio buttons 708.

The master volume for the IISet can be designated in panel 710 by either entering a valid pathname in textbox 712 or activating the "Select Volume . . . " button 716. The Select Volume button 716 will invoke a volume browser that is implemented by the aforementioned DSV bean. When a volume is designated, the capacity of the volume will be displayed in the box 714 by information obtained from the DSV bean.

Panel 730 allows the shadow volume to be designated. Radio buttons 732 to select either a volume or a file for the shadow. If a volume is selected, a specific volume can be designated by either entering a valid pathname in textbox 734 or activating the "Select Volume . . . " button 738. The Select Volume button 738 will invoke the aforementioned volume browser. When a volume is designated, the capacity of the volume will be displayed in the box 736.

If a file is selected with radio buttons 732, a specific file can be designated by either entering a valid pathname in textbox 740 or activating the "Select File . . . " button 742. The Select File button 740 will invoke a conventional file browser that allows designation of a file.

The bitmap volume for the new IISet can be designated in panel 750 by using radio buttons 752 to select either a volume or a file for the bitmap. If a volume is selected, a specific volume can be designated by either entering a valid pathname in textbox 754 or activating the "Select Volume . . . " button 760. The Select Volume button 760 will invoke the volume browser. When a volume is designated, the capacity of the volume will be displayed in the box 756.

If a file is selected, a specific file can be designated by either entering a valid pathname in textbox 762 or activating the "Select File . . . " button 764. The Select File button 764 will invoke a conventional file browser that allows designation of a file.

If the manager chooses a dependent shadow volume type with radio buttons 708, and size of the specified shadow volume is smaller than the size of the specified master volume, the overflow volume pane 718 will be enabled. In pane 718, a manager can designate a volume pathname in textbox 722 or designate a volume by means of the volume browser invoked with button 726. As before, the capacity of the designated volume will be displayed in textbox 724. The designated overflow volume becomes part of the new IISet.

Once the parameters have been specified for the new IISet, the set can be created by selecting "Ok" button 780. Alternatively, set creation can be canceled by selecting the "Cancel" button 782.

Figure 8:
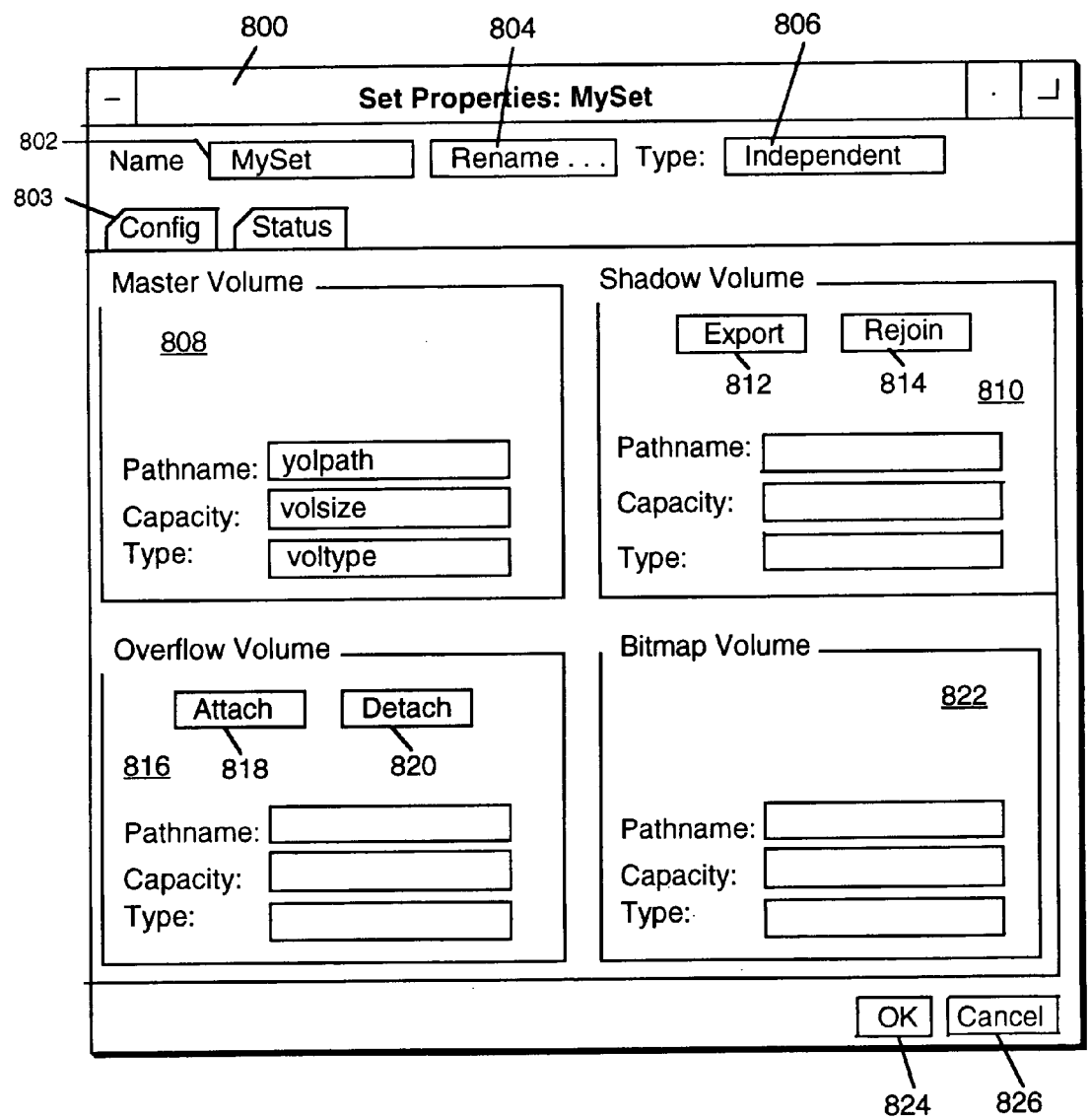
FIG. 8 is a screen shot of a screen display generated by a graphic user interface showing a dialog box display for displaying and editing data imaging set properties.

If a manager selects the "Properties" option from the action dropdown 636 (FIG. 6) the set properties dialog 800 shown in FIG. 8 is displayed. When the "Config" tab 803 of dialog 800 is selected, the dialog displays all information for the set, including the set name in area 802 and the set type in area 806. After a set is created, the type cannot be changed. However, the set name can be changed by actuating the "Rename" button 804 and entering a new name into area 802. The action can be accepted by actuating the Ok button 824 or canceled by actuating the Cancel button 826.

Pane 808 displays the volume path, capacity, and type of the set master volume. Similarly, pane 810 displays the volume path, capacity, and type of the set shadow volume. If the specified shadow was a file rather than a volume, then only the pathname will display and the capacity and type will be blank. In addition, the shadow volume can be exported or rejoined, as discussed above, by actuating button 812 or 814, respectively.

Pane 822 displays the volume path, capacity, and type of the set bitmap volume. If the specified bitmap or was a file rather than a volume, then only the pathname will display and the capacity and type will be blank. Similarly, pane 816 displays the volume path, capacity, and type of the set overflow volume, if any. In addition, the overflow volume can be attached or detached from the IISet, as discussed above, by actuating button 818 or 820, respectively.

Figure 9:
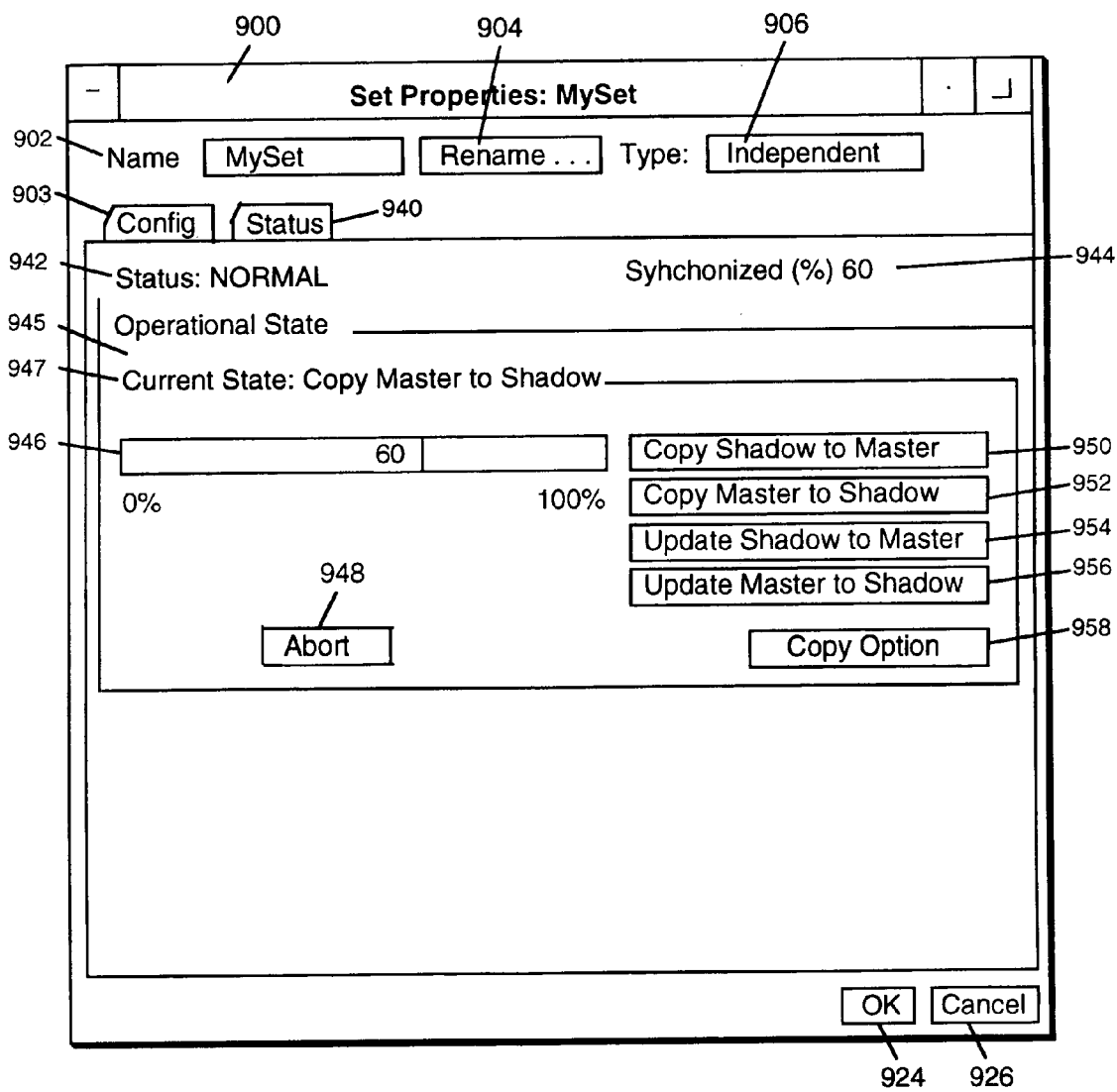
FIG. 9 is a screen shot of a screen display generated by a graphic user interface showing a dialog box display for examining the status of data imaging sets.

When the "Status" tab of the set properties dialog is selected the screen display shown in FIG. 9 appears. In FIG. 9, elements corresponding to elements shown in FIG. 8 have been given corresponding numeral designations. For example, name area 802 in FIG. 8 corresponds to name area 902 in FIG. 9. The description of these elements with relation to FIG. 8 also applies to FIG. 9. The status pane selected with tab 940 displays operating status (normal/degraded/error) 942 as well as percentage of synchronization between master and shadow volumes 944. Operational state pane 945 displays the operation in progress 947 and a current state (when appropriate) in progress bar 946 that indicates percentage of the volume copy that has been completed. If the "Abort" button 948 is selected, then any current operation in progress between the master and shadow volumes of the IISet will be aborted.

In addition, various operations can be initiated by selecting the appropriate buttons. These operation include: copy shadow to master initiated by selecting button 950, copy master to shadow initiated by selecting button 952, update shadow to master initiated by selecting button 954 and update master to shadow initiated by selecting button 956. A "Copy Options . . . " button 958 will display copy delay and unit size parameters. The unit size parameter relates to the maximum number of blocks to copy before pausing in order to prevent saturation of the I/O channel. The copy delay parameter relates to the time to pause the copy operation when the system reaches the maximum number of blocks to copy. The selected parameters are confirmed by selecting the Ok button 924 or discarded by selecting the Cancel button 926.

Figure 10:
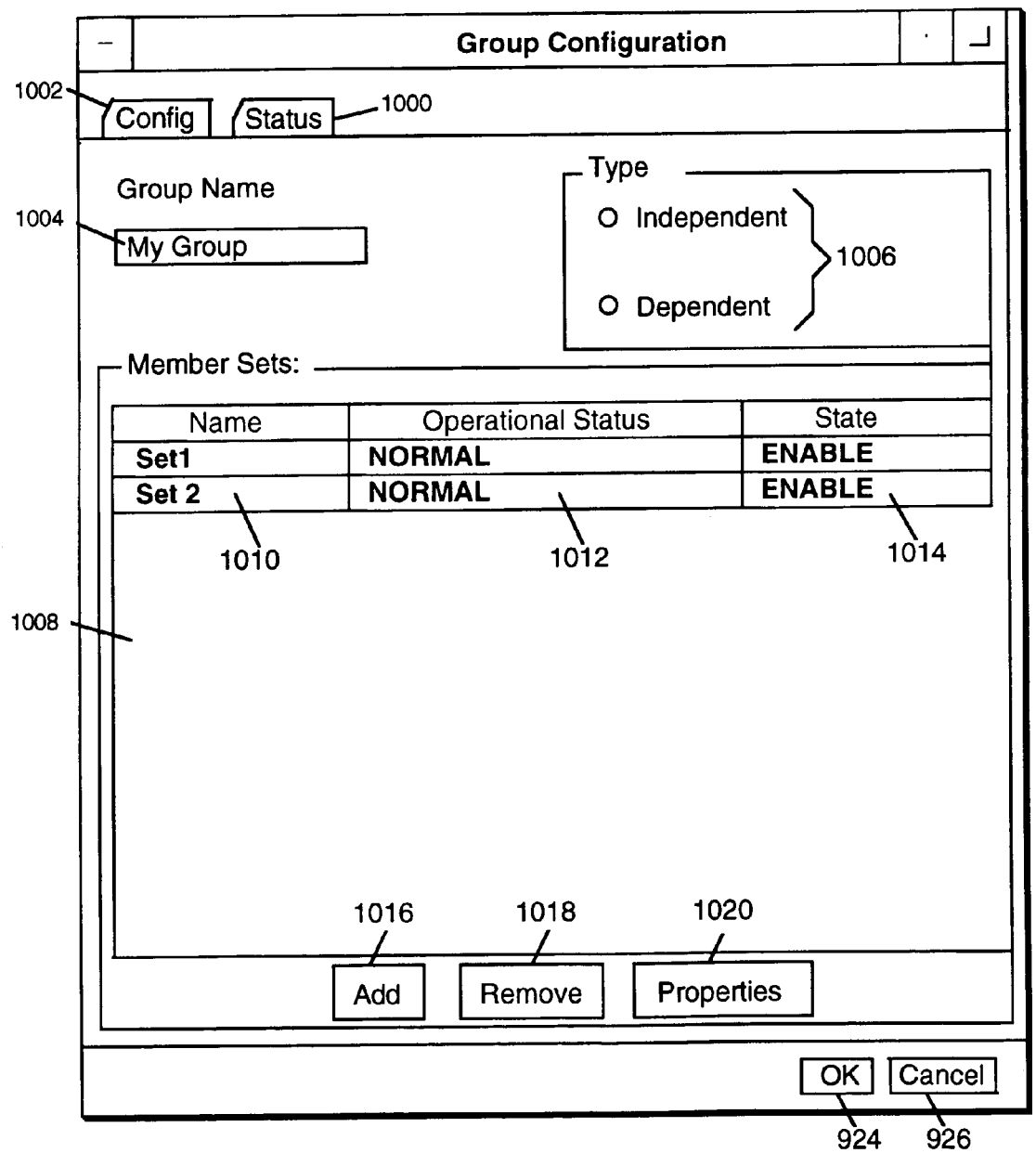
FIG. 10 is a screen shot of a screen display generated by a graphic user interface showing a dialog box display for configuring data imaging set groups.

When a manager clicks the "New" option and selects "Group" in the extended menu in the dropdown 636 (FIG. 6), the group configuration dialog 1000 shown in FIG. 10 appears. FIG. 10 shows the dialog box 1000 when the "Config" tab 1002 is selected. In the configuration pane, a manager can create a group by entering a name into textbox 1004 and selecting a type with radio buttons 1006. The pane also includes a member set table 1008 that shows all the sets in the group with one set illustrated per row. If there are no sets in the group, the table is empty. Table column 1010 displays the set name. Table column 1012 displays the set status and column 1014 displays the set state.

Figure 11:
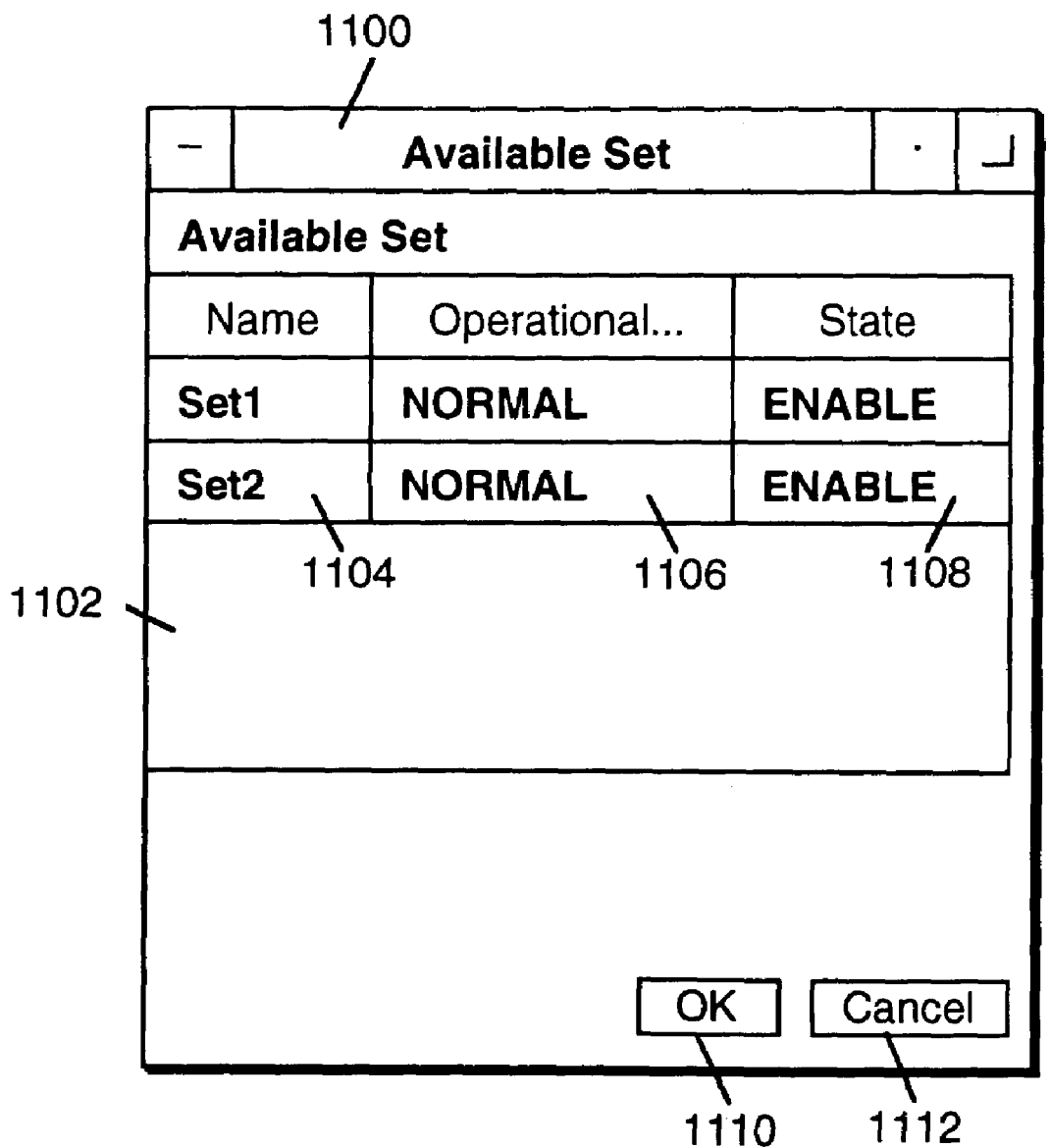
FIG. 11 is a screen shot of a screen display generated by a graphic user interface showing sets available for addition to a set group.

The "Add" button 1016 can be selected to add IISets to the group. When Add button 1016 is actuated, a new "Available Set" dialog box 1100 shown in FIG. 11 is displayed. Dialog box 1100 displays available sets of the type selected by the radio buttons 1006 (FIG. 10) which were created and configured as discussed above. The table 1102 shows the set name in column 1104, the set status in column 1106 and the set state in column 1108. A manager can select one or more available IISets and then confirm the selection by selecting the "Ok" Button 1110. Alternatively, the set selection can be discarded by selecting the "Cancel" button 1112.

Returning to FIG. 10, to remove an IISet from the IIGroup, a manager selects a row in the member set table indicating the set to be removed and then selects the "Remove" button 1018. Selection of a row in the member set table, followed by a selection of the "Properties" button 1020 will result in a display of the corresponding Set properties dialog box as shown in FIGS. 8 and 9.

Figure 12:
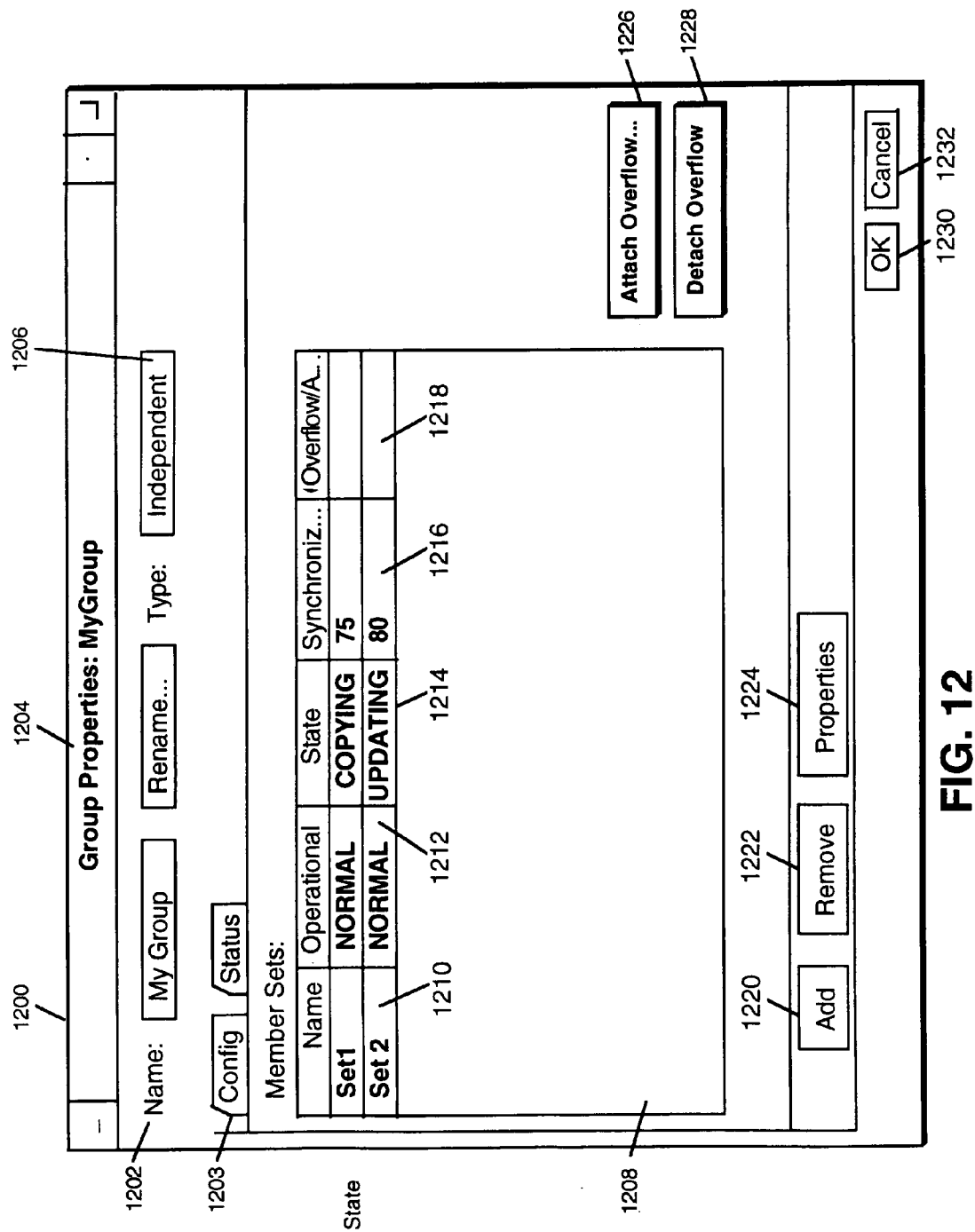
FIG. 12 is a screen shot of a screen display generated by a graphic user interface showing a dialog box display for displaying and editing data imaging set group properties.

If a group is selected in the main screen illustrated in FIG. 6 and the "Properties" option of the action dropdown 636 selected, the Group Properties dialog box 1200 shown in FIG. 12 is displayed. . When the "Config" tab 1203 of dialog 1200 is selected, the dialog displays all information for the group, including the group name in area 1202 and the group type in area 1206. After a group is created, the type cannot be changed. However, the group name can be changed by actuating the "Rename" button 1204 and entering a new name into area 1202. The action can be accepted by actuating the Ok button 1230 or canceled by actuating the Cancel button 1232.

Pane 1208 displays the IISets in the group in a member set table with one row per set. The table also shows the set name in column 1210, the set status in column 1212, the set state in column 1214, the percent synchronized in column 1216 and the pathname of any overflow volumes attached to the set in column 1218.

Overflow volumes can be managed by selecting a set in the member set table and using buttons 1226 and 1228 to perform attach and detach operations, respectively.

The "Add" button 1220 can be selected to add IISets to the group. When Add button 1220 is actuated, a new "Available Set" dialog box 1100 as shown in FIG. 11 is displayed to allow set selection. To remove an IISet from the IIGroup, a manager selects a row in the member set table indicating the set to be removed and then selects the "Remove" button 1222. Selection of a row in the member set table, followed by a selection of the "Properties" button 1224 will result in a display of the corresponding Set properties dialog box as shown in FIGS. 8 and 9. The set management actions can be accepted by actuating the Ok button 1230 or canceled by actuating the Cancel button 1232

Figure 13:
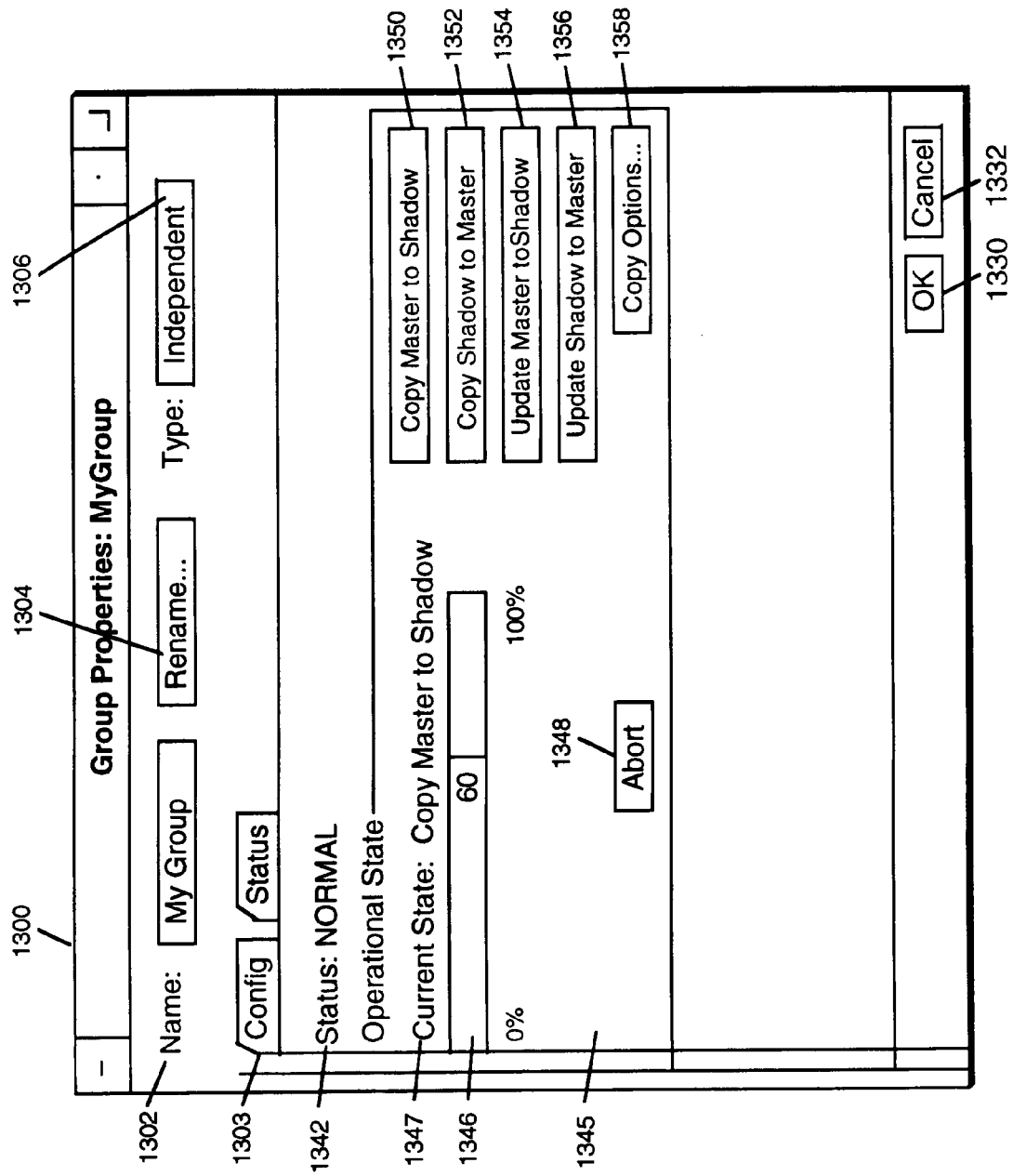
FIG. 13 is a screen shot of a screen display generated by a graphic user interface showing a dialog box display for examining the status of data imaging set groups.

When the "Status" tab of the group properties dialog is selected the screen display shown in FIG. 13 appears. In FIG. 13, elements corresponding to elements shown in FIG. 12 have been given corresponding numeral designations. For example, name area 1202 in FIG. 12 corresponds to name area 1302 in FIG. 13. The description of these elements with relation to FIG. 12 also applies to FIG. 13. The status pane selected with tab 1340 displays operating status (normal/degraded/error) 1342. Operational state pane 1345 displays the operation in progress 1347 and a current state (when appropriate) in progress bar 1346 that indicates percentage of the volume copy that has been completed. If the "Abort" button 1348 is selected, then any current operation in progress between the master and shadow volumes of the IISet will be aborted.

In addition, various operations can be initiated atomically on all sets in the group by selecting the appropriate buttons. These operation include: copy master to shadow initiated by selecting button 1350, copy shadow to master initiated by selecting button 1352, update master to shadow initiated by selecting button 1354 and update shadow to master initiated by selecting button 1356. A "Copy Options . . . " button 1358 will display copy delay and unit size parameters as discussed above. The selected parameters are confirmed by selecting the Ok button 1330 or discarded by selecting the Cancel button 1332.

Alternatively, a data imaging federated bean can also be controlled by a command line interface. The basic command is iiadm. Various parameters and variables are used with this command to generate the appropriate information that can be used by the DSV bean to perform the desired operation. The various operations that can be specified with the command line interface include the following.

| | |
|---|---|
| iiadm-a [set] | Abort any current copy operation on the IISet set. |
| iiadm-A [set] ovol | Attach overflow volume ovol to the IISet set. The overflow volume may be attached to more than one IISet. |
| iiadm-B set | Remove IISet set from an IIGroup. |
| iiadm-c sm [set] | Copy to the shadow or master volume for the designated IISet set. If sm is s then it is a copy to the shadow volume, otherwise if it is m then it is a copy to the master volume. |
| iiadm-C [id] | Create IIGroup. Group will be 'i'ndependent, 'd'ependent or have a default type. |
| iiadm-d [set] | Disable IISet set. |
| iiadm-D [set] | Detach overflow volume from IISet set. |
| iiadm-e id mvol svol | Enable independent or dependent IISet with master mvol, shadow svol and bitmap bmap volumes with an optional set_name. |
| bmap [set_name] | |
| iiadm-E vol | Export volume vol. |
| iiadm-G | List all IIGroups. |

-continued

| | |
|---|---|
| iiadm-h | Print a command usage help text to stderr. |
| iiadm-i [set|all] | Display status of IISet set, or of all IISets. |
| iiadm-I vol bmap | Import volume vol using bitmap bmap. |
| iiadm-J vol [bmap] | Rejoin volume vol with additional differences in bitmap bmap. |
| iiadm-l | List all IISets currently configured in the kernel module. |
| iiadm-L | List all overflow volumes currently configured in the kernel module. |
| iiadm-M set | Add IISet set into an IIGroup. |
| iiadm-N name | Give an IIGroup a new name. |
| iiadm-O vol | Initialize volume vol for use as an overflow for short shadow volumes. |
| iiadm-P dly unit [set] | Set copy parameters for IISet set to delay dly system clock ticks every unit number of chunks copied. |
| iiadm-Q vol | Display status of overflow volume vol. |
| iiadm-r [set|all] | Resume IISet set or all IISets. |
| iiadm-R [set] | Reset IISet set. |
| iiadm-s [set|all] | Suspend IISet set or all shadow sets. |
| iiadm-u sm [set] | Update to the shadow or master volume for the designated IISet set. If sm is s then it is a copy to the shadow volume, otherwise if it is m then it is a copy to the master volume. |
| iiadm-v | Print software version. |
| iiadm-w [set] | Wait for any updates involving IISet set to completion or abort. |
| iiadm-X | Delete IIGroup. |
| iiadm-Z vol | Delete overflow volume. |

When using these commands, the command and accompanying parameters are first separated by a conventional parser. The parsed command and parameters are then provided to an interpreter which generates the appropriate objects and calls the API routines exported by the data imaging bean to set up the data imaging system.

Figure 14:
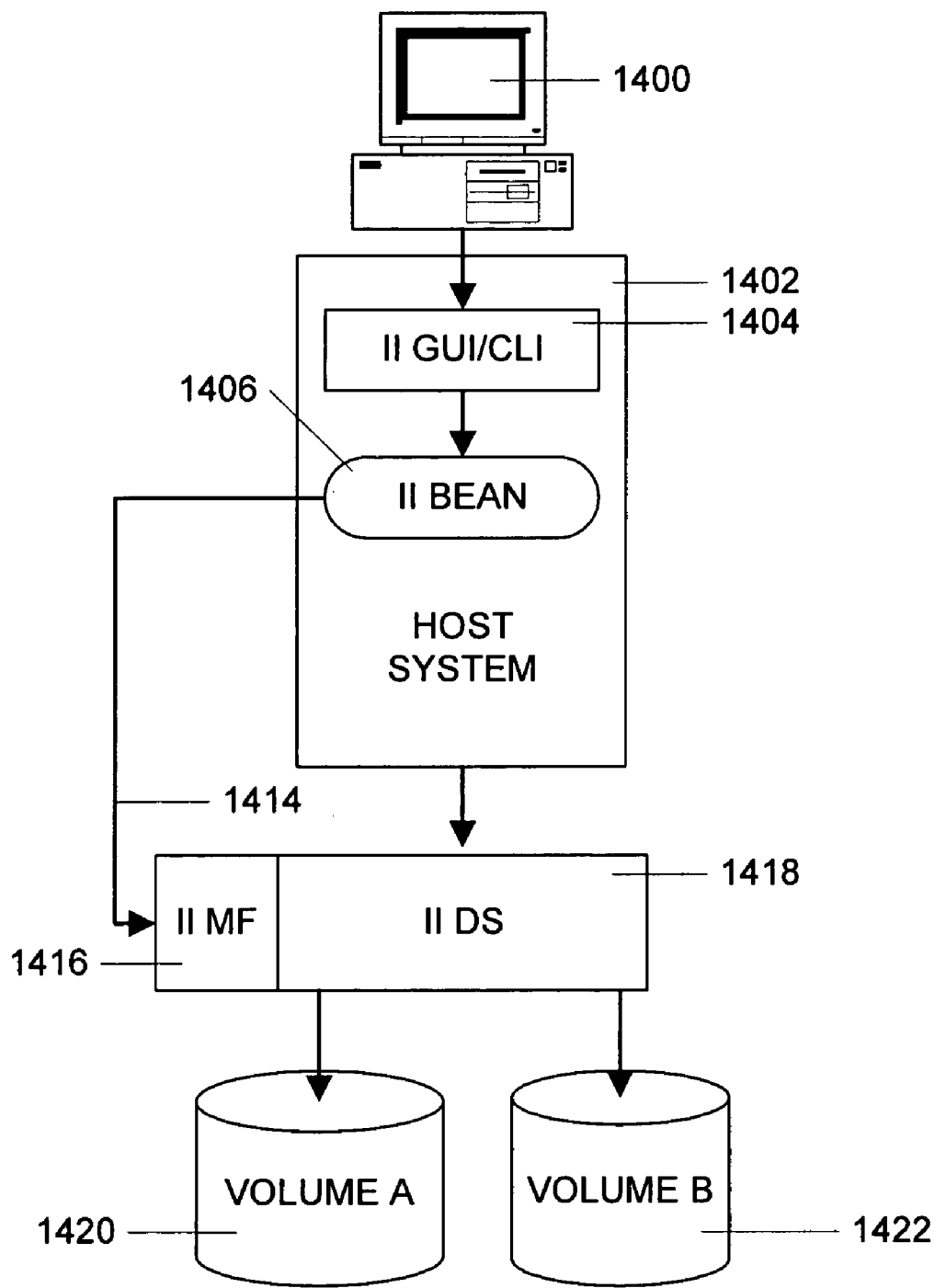
FIG. 14 is a schematic block diagram illustrating the implementation of a simple data imaging system using the principles of the present invention.
Figure 15:
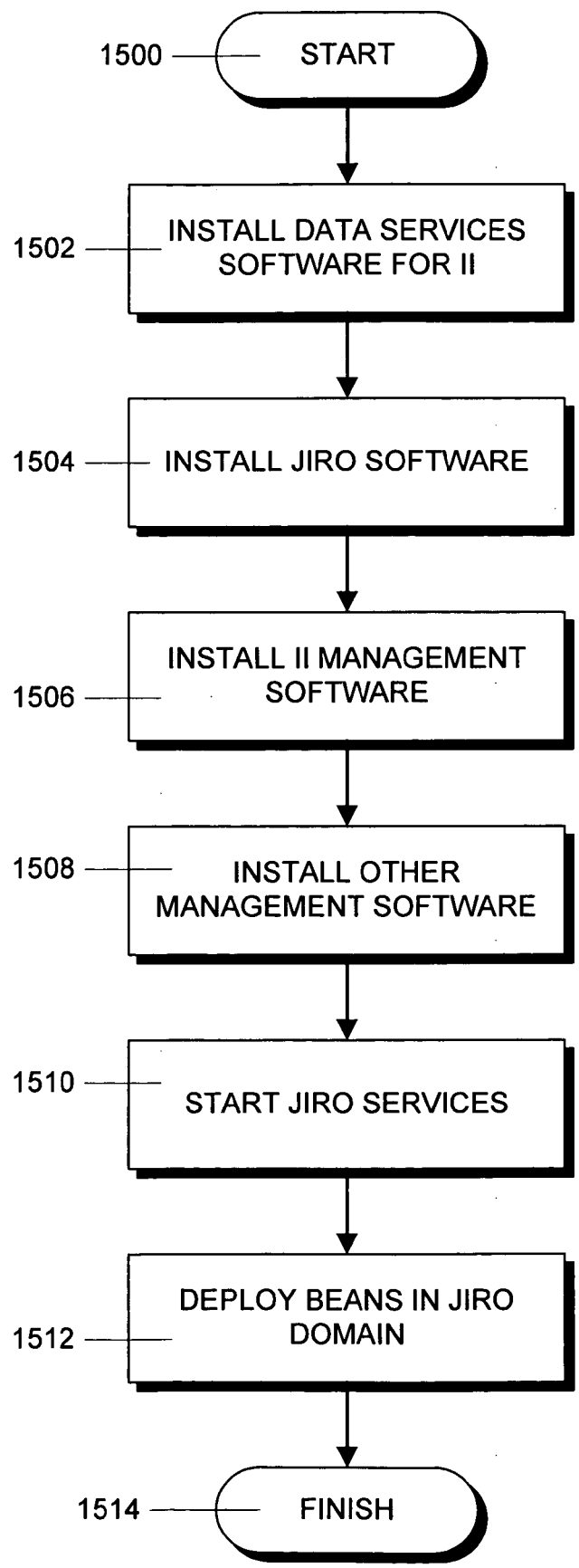
FIG. 15 is a flowchart showing the steps of an illustrative process for installing data imaging software in the system of FIG. 14.
Figure 16A:
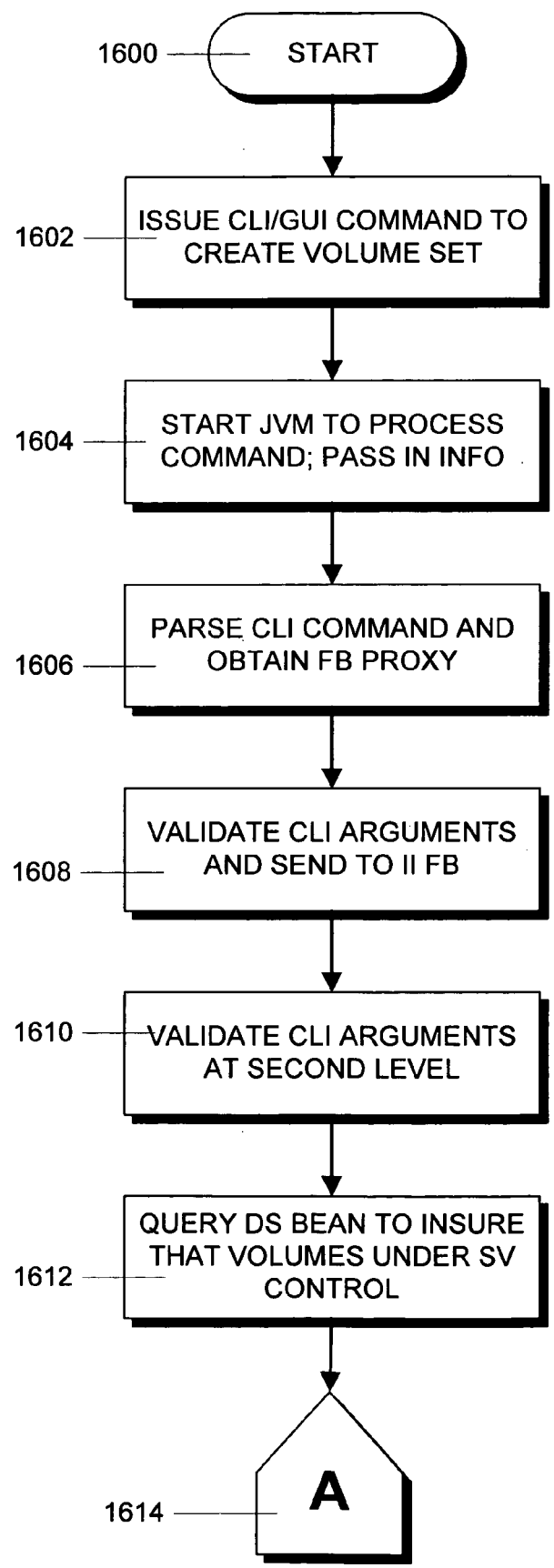
FIGS. 16A–16C, when placed together, form a flowchart showing the steps of an illustrative process for configuring the data imaging system of FIG. 14.
Figure 16B:
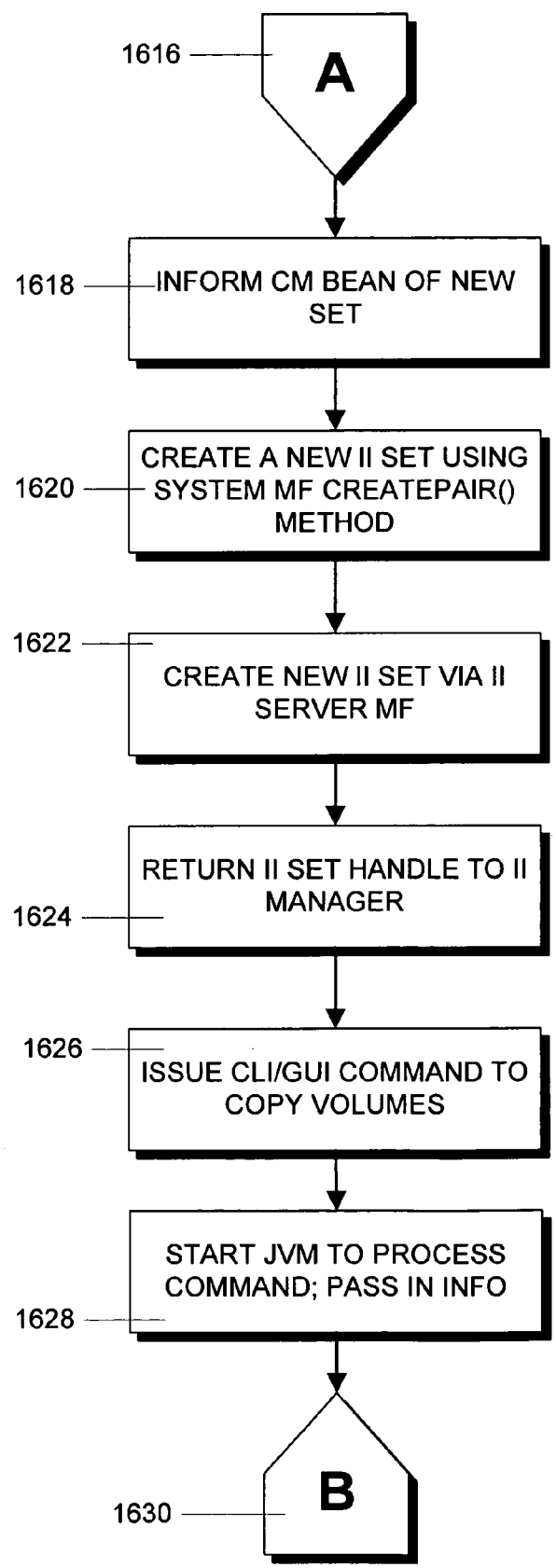
Figure 16C:
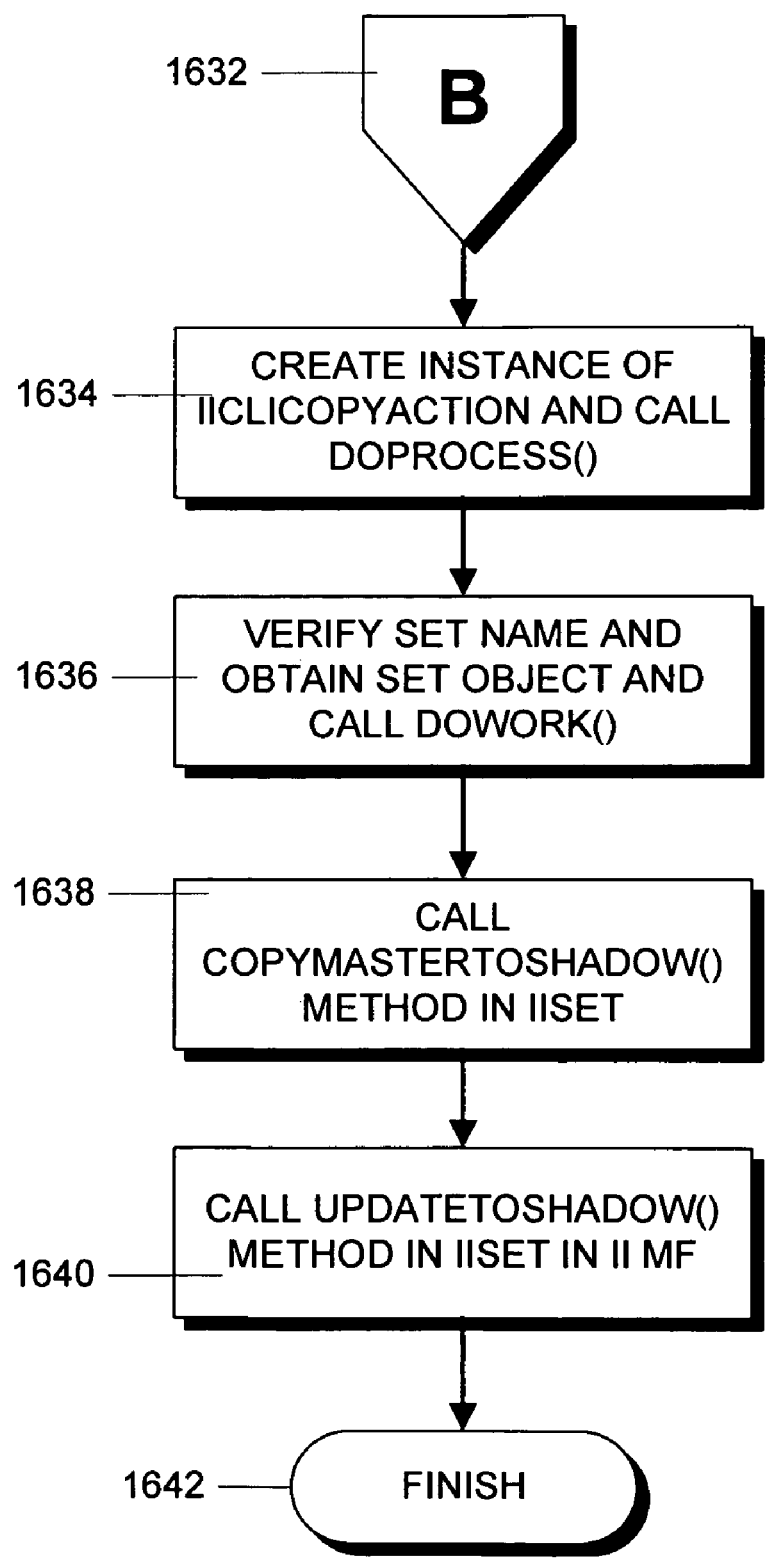

An example data imaging system setup is illustrated in FIG. 14. FIG. 15 illustrates the steps performed in initially configuring the system. FIGS. 16A–16C show a flowchart illustrating the steps carried out by the inventive data imaging system to set up the configuration shown in FIG. 14 and to copy data from volume A (1420) of a host system A (1402) to volume B (1422) of the same host system using the inventive instant imaging (II) management services software.

In order to use the inventive system, the software that is required must first be installed in the system. The steps of the installation process on host system A are shown in FIG. 15. The installation process begins in step 1500 and proceeds to step 1502 where the data services software used for instant imaging is installed on host system 1302. This software includes the data service layer software 252 (FIG. 2) and the data imaging layer 254. Other layers, such as the cache layer can also be included in this installation process.

Next in step 1504, the Jiro™ software is installed. The installation process for this software is explained in detail in the aforementioned Jiro SDK.

In step 1506, the II management software is installed. This software includes the DI management facade 240 and the native interface 242. It also includes the data imaging federated bean 232 (IIBean) and the command line interface 222 or graphic user interface 220, as appropriate.

In step 1508, other necessary management services software is installed. This software includes other management facades, such as the data services management facade 244 and its accompanying native interface 246 and federated beans such as the configuration manager bean 230 and the data services bean 234.

Then, in step 1510, the Jiro services software is started with the Jiro domain name jiro:Host. In step 1512, the data imaging and other federated beans are deployed in the Jiro domain. During this step, necessary management facades get automatically instantiated. The process then finishes in step 1514. After the installation and deployment steps are complete in host 1402, the process of configuring the system and making a point-in-time backup of master Volume A to shadow Volume B can begin. The steps involved in this process are illustrated in FIGS. 16A–16C.

After the installation and deployment steps are complete, the user needs to execute one CLI command to enable the IISet. From that point on, the shadow volume (Volume B) is an exact duplicate of the master (Volume_A) at the point that the IISet volume set was enabled. Any further changes to the master will not show up on the shadow.

The configuration process begins in step 1600 and proceeds to step 1602 where, from the command prompt at terminal 1400, the system manager issues the following command, or a similar command:

iiadm-e dep Volume_A Volume_B MetaInfoVolume

This command, as set forth in step 1604, starts up a Java Virtual Machine for the data imaging CLI program and passes in the necessary information, such as the volumes to be configured, the port number for the Jiro system, the domain name in which the federated beans and management facades are deployed ("jiro:Host") as well as the data imaging options used in aforementioned iiadm command.

Next, in step 1606, the CLI parses the command line options used while invoking iiadm. After parsing, the CLI software determines that iiadm was invoked to create a data imaging IISet. Since this operation will need to use the IIBean federated bean, the CLI software uses the Jiro lookup service to get a handle (proxy) of the IIBean that is managing data imaging services on that host in the specified Jiro domain.

In step 1608, once the CLI program locates the appropriate IIBean and retrieves the proxy to the IIBean, it validates the command line arguments and sends them, via the proxy, to the IIBean by invoking the createIISet( ) method in the IIBean.

The IIBean then creates a proxy to a new IISet. Creation of this new proxy causes several steps to happen. First, in step 1610, the command line arguments are put through a second level of validation. Then, in step 1612, the data service volume bean (230, FIG. 2) is queried to verify that the volumes being made part of the new IISet are under the control of the SV layer. The process then proceeds, via off-page connectors 1614 and 1616 to step 1618.

Next, in step 1618, the configuration manager bean (234, FIG. 2) is informed of the new IISet. In step 1620, the IISystem management facade is told to perform the create operation by invoking the createIIPair( ) method on its proxy.

In step 1622, the IISystem management facade calls the IIManager management facade to create the IISet that, in turn, calls the IIServer management facade method createServerPair( ). This method sets up the data structures necessary for enabling the set within the host computer kernel. The IIServer management creates an IIServerPair proxy that makes calls into the native interface layer that performs the enable operation. At this point, the set is enabled within the data service in the host computer kernel.

After the new IISet is created and enabled, a handle to it is returned to the IIServer management facade, which returns the set as an IISet object to the IIManager, which stores a proxy to the object in its proxy list as set forth in step 1624. At this point, the new IISet is enabled and working, which completes the command issued in step 1602. It is now possible to create a new "snapshot" of the master volume. This is achieved by issuing the following CLI command as described in step 1626.

iiadm-u s MyIISet

When the command mentioned above is issued, a Java Virtual Machine is started as set forth in step 1628 for the data imaging CLI program and the necessary information is passed in, such as the IISet to be used as well as the data imaging options used in aforementioned iiadm command. The process then proceeds, via off-page connectors 1630 and 1632, to step 1634 where the CLI parses the command line options used while invoking iiadm. After parsing, the CLI software determines that iiadm was invoked to perform an update action. As a result, in step 1634, the CLI code creates an instance of IICLICopyAction and calls the doProcess( ) method on it.

In step 1636, the doProcess( ) method checks to see in which direction the copy should be performed (master-to-shadow or shadow-to-master). In this case, the user selected option "s" which copies the master volume to the shadow volume. The method then verifies that the set the user entered is a valid set name. If it is, then a reference to the set object is obtained and the doWork( ) method is invoked.

The doWork( ) method calls the copyMasterToShadow( ) method of the IISet in the IIBean in step 1638. This method checks the set to see if it is a member of a group. If it turns out that there are other group members, the update operation is applied to all of the group members at once. In this example, the set is not a member of a group, and so a copy will only be performed on only the volumes in that set.

In step 1640, the IISet calls the IISet updateToShadow( ) method in the II management facade. This method call results in a call to the IIManager's updateMasterToShadow( ) method. This latter method makes calls into the native interface layer that performs the update operation. At this point, the snapshot of the master volume has been completed and the process finishes in step 1642. Steps 1626–1642 can be repeated whenever a user desires to take a new snapshot.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing a data imaging service from a management terminal in a distributed computer system having a host computer system with at least one storage device connected to the computer system by driver software, the method comprising:
   (a) inserting an interface layer between the driver software and the storage device, the interface layer exporting a platform dependent API comprising a plurality of API methods that controls data passing between the driver software and the storage device;
   (b) running, in the host computer system, management facade software that receives calls to platform-independent methods and generates at least one API method call to the interface layer in order to execute the platform-independent method calls;
   (c) running, in the host computer system, a federated bean that generates platform-independent method calls to the management facade to control the interface layer via the plurality of API methods; and
   (d) controlling the federated bean to designate master volumes, shadow volumes and bitmap volumes and to transfer data between specified master and shadow volumes.

2. The method of claim 1 wherein step (d) comprises controlling the federated bean with a command line interface.

3. The method of claim 1 wherein step (d) comprises controlling the federated bean with a graphical user interface.

4. The method of claim 1 wherein step (d) comprises:
   (d1) creating a volume set;
   (d2) designating a master volume, a shadow volume and a bitmap volume as part of the volume set; and
   (d3) performing data imaging operations on the volume set.

5. The method of claim 4 wherein a plurality of volume sets are created and wherein the method further comprises:
   (e) creating a set group;
   (f) adding selected volume sets to the set group; and
   (g) controlling the set group with a single command to perform data imaging operations on each set in the set group.

6. The method of claim 4 further comprising attaching an overflow volume to the volume set.

7. The method of claim 4 wherein the computer system has a first host with a volume set thereon and a second host and the method comprises exporting a shadow volume in the volume set from the first host.

8. The method of claim 7 further comprising importing the shadow volume exported by the first host into the second host.

9. Apparatus for managing a data imaging service from a management terminal in a distributed computer system having a host computer system with at least one storage device connected to the computer system by driver software, the apparatus comprising:
   an interface layer located between the driver software and the storage device, the interface layer exporting a platform dependent API comprising a plurality of API methods that controls data passing between the driver software and the storage device;
   management facade software that runs in the host computer system and receives calls to platform-independent methods and generates at least one API method call to the interface layer in order to execute the platform-independent method calls;
   a federated bean that runs in the host computer system and generates platform-independent method calls to the management facade to control the interface layer via the plurality of API methods; and
   a presentation program that controls the federated bean to designate master volumes, shadow volumes and bitmap volumes and to transfer data between specified master and shadow volumes.

10. The apparatus of claim 9 wherein the presentation program comprises a command line interface.

11. The apparatus of claim 9 wherein the presentation program comprises a graphical user interface.

12. The apparatus of claim 9 wherein the presentation program comprises:
   program methods for creating a volume set;
   a screen display for designating a master volume, a shadow volume and a bitmap volume as part of the volume set; and
   program methods for performing data imaging operations on the volume set.

13. The apparatus of claim 12 wherein a plurality of volume sets are created and wherein the apparatus further comprises:
   program methods for creating a set group;
   a screen display for adding selected volume sets to the set group; and
   program methods for controlling the set group with a single command to perform data imaging operations on each set in the set group.

14. The apparatus of claim 12 further comprising program methods for attaching an overflow volume to the volume set.

15. The apparatus of claim 12 wherein the computer system has a first host with a volume set thereon and a second host and the apparatus comprises means for exporting a shadow volume in the volume set from the first host.

16. The apparatus of claim 15 further comprising means for importing the shadow volume exported by the first host into the second host.

17. A computer program product for managing a data imaging service from a management terminal in a distributed computer system having a host computer system with at least one storage device connected to the computer system by driver software, the computer program product comprising a computer usable medium having computer readable program code thereon, including:
   interface layer program code located between the driver software and the storage device, the interface layer code exporting a platform dependent API comprising a plurality of API methods that controls data passing between the driver software and the storage device;
   management facade software that runs in the host computer system and receives calls to platform-independent methods and generates at least one API method call to the interface layer in order to execute the platform-independent method calls;

a federated bean that runs in the host computer system and generates platform-independent method calls to the management facade to control the interface layer via the plurality of API methods; and a presentation program that controls the federated bean to designate master volumes, shadow volumes and bitmap volumes and to transfer data between specified master and shadow volumes.

18. The computer program product of claim 17 wherein the presentation program comprises a command line interface.

19. The computer program product of claim 17 wherein the presentation program comprises a graphical user interface.

20. A computer data signal embodied in a carrier wave for managing a data imaging service from a management terminal in a distributed computer system having a host computer system with at least one storage device connected to the computer system by driver software, the computer data signal comprising:

interface layer program code located between the driver software and the storage device, the interface layer code exporting a platform dependent API comprising a plurality of API methods that controls data passing between the driver software and the storage device;

management facade software that runs in the host computer system and receives calls to platform-independent methods and generates at least one API method call to the interface layer in order to execute the platform-independent method calls;

a federated bean that runs in the host computer system and generates platform-independent method calls to the management facade to control the interface layer via the plurality of API methods; and a presentation program that controls the federated bean to designate master volumes, shadow volumes and bitmap volumes and to transfer data between specified master and shadow volumes.

* * * * *